(12) United States Patent
Schumacher et al.

(10) Patent No.: US 11,794,551 B2
(45) Date of Patent: Oct. 24, 2023

(54) OPTIMIZED POWER DISTRIBUTION TO TRANSPORT CLIMATE CONTROL SYSTEMS AMONGST ONE OR MORE ELECTRIC SUPPLY EQUIPMENT STATIONS

(71) Applicant: THERMO KING LLC, Minneapolis, MN (US)

(72) Inventors: Ryan Wayne Schumacher, Bloomington, MN (US); Matthew Srnec, Minnetonka, MN (US); Philip Lewis Lavrich, Mooresville, NC (US); Wallace Stephen Hubbard, Chanhassen, MN (US); Matthias Gorski, Bochum (DE); Eckardt Augenstein, Essen (DE)

(73) Assignee: THERMO KING LLC, Minneapolis, MN (US)

( * ) Notice: Subject to any disclaimer, the term of this patent is extended or adjusted under 35 U.S.C. 154(b) by 245 days.

(21) Appl. No.: 17/015,190

(22) Filed: Sep. 9, 2020

(65) Prior Publication Data

US 2021/0070141 A1 Mar. 11, 2021

Related U.S. Application Data

(60) Provisional application No. 62/897,833, filed on Sep. 9, 2019.

(51) Int. Cl.
*B60H 1/00* (2006.01)
*H02J 1/10* (2006.01)
(Continued)

(52) U.S. Cl.
CPC .......... *B60H 1/00428* (2013.01); *H02J 1/106* (2020.01); *H02J 1/14* (2013.01);
(Continued)

(58) Field of Classification Search
CPC ... B60H 1/00428; B60H 1/3232; H02J 1/106; H02J 1/14; H02J 3/007; H02J 3/32;
(Continued)

(56) References Cited

U.S. PATENT DOCUMENTS

| 3,875,483 A | 4/1975 | Farr |
| 5,104,037 A | 4/1992 | Karg et al. |

(Continued)

FOREIGN PATENT DOCUMENTS

| CN | 2456117 | 10/2001 |
| CN | 1885660 | 12/2006 |

(Continued)

OTHER PUBLICATIONS

Extended European Search Report, issued in the corresponding European patent application No. 20195238.9, dated Feb. 1, 2021, 10 pages.

(Continued)

*Primary Examiner* — Richard Tan
(74) *Attorney, Agent, or Firm* — Hamre, Schumann, Mueller & Larson, P.C.

(57) ABSTRACT

A method for optimizing power distribution amongst one or more electrical supply equipment stations at a power distribution site is provided. The method includes obtaining infrastructure data about the power distribution site, obtaining vehicle/transport climate control system data from one or more transport climate control systems and one or more vehicles demanding power from the one or more electrical supply equipment, and obtaining external data from an external source that can impact power demand from the one or more transport climate control systems. Each of the one or more transport climate control systems configured to provide climate control within a climate controlled space. The method also includes generating an optimized power (Continued)

distribution schedule based on the infrastructure data, the vehicle/transport climate control system data and the external data, and distributing power to the one or more transport climate control systems based on the optimized power distribution schedule.

15 Claims, 7 Drawing Sheets

(51) Int. Cl.
   H02J 1/14 (2006.01)
   H02J 3/32 (2006.01)
   H02J 3/00 (2006.01)
(52) U.S. Cl.
   CPC ............ *H02J 3/007* (2020.01); *H02J 3/32* (2013.01); *H02J 2310/40* (2020.01)
(58) Field of Classification Search
   CPC .............. H02J 2310/40; H02J 2310/60; H02J 13/00032; Y02T 10/88
   USPC ........................................................ 701/36
   See application file for complete search history.

(56) References Cited

U.S. PATENT DOCUMENTS

| | | |
|---|---|---|
| 5,231,849 A | 8/1993 | Rosenblatt |
| 6,280,320 B1 | 8/2001 | Paschke et al. |
| 6,487,869 B1 | 12/2002 | Sulc et al. |
| 6,518,727 B2 | 2/2003 | Oomura et al. |
| 6,560,980 B2 | 5/2003 | Gustafson et al. |
| 6,600,237 B1 | 7/2003 | Meissner |
| 6,631,080 B2 | 10/2003 | Trimble et al. |
| 6,652,330 B1 | 11/2003 | Wasilewski |
| 6,688,125 B2 | 2/2004 | Okamoto et al. |
| 6,753,692 B2 | 6/2004 | Toyomura et al. |
| 6,925,826 B2 | 8/2005 | Hille et al. |
| 7,011,902 B2 | 3/2006 | Pearson |
| 7,120,539 B2 | 10/2006 | Krull et al. |
| 7,122,923 B2 | 10/2006 | Lafontaine et al. |
| 7,151,326 B2 | 12/2006 | Jordan |
| 7,176,658 B2 | 2/2007 | Quazi et al. |
| 7,206,692 B2 | 4/2007 | Beesley et al. |
| 7,256,516 B2 * | 8/2007 | Buchanan ............... B60L 53/14 307/62 |
| 7,327,123 B2 | 2/2008 | Faberman et al. |
| 7,424,343 B2 | 9/2008 | Kates |
| 7,449,798 B2 | 11/2008 | Suzuki et al. |
| 7,532,960 B2 | 5/2009 | Kumar |
| 7,728,546 B2 | 6/2010 | Tanaka et al. |
| 7,730,981 B2 | 6/2010 | McCabe et al. |
| 7,745,953 B2 | 6/2010 | Puccetti et al. |
| 7,806,796 B2 | 10/2010 | Zhu |
| 7,830,117 B2 | 11/2010 | Ambrosio et al. |
| 7,898,111 B1 | 3/2011 | Pistel |
| 7,900,462 B2 | 3/2011 | Hegar et al. |
| 3,020,651 A1 | 9/2011 | Zillmer et al. |
| 8,030,880 B2 | 10/2011 | Alston et al. |
| 8,134,339 B2 | 3/2012 | Burlak et al. |
| 3,170,886 A1 | 5/2012 | Luff |
| 3,214,141 A1 | 7/2012 | Froeberg |
| 8,295,950 B1 | 10/2012 | Wordsworth et al. |
| 8,381,540 B2 | 2/2013 | Alston |
| 8,441,228 B2 | 5/2013 | Brabee |
| 8,476,872 B2 | 7/2013 | Truckenbrod et al. |
| 8,487,458 B2 | 7/2013 | Steele et al. |
| 8,541,905 B2 | 9/2013 | Brabee |
| 8,602,141 B2 | 12/2013 | Yee et al. |
| 8,626,367 B2 | 1/2014 | Krueger et al. |
| 8,626,419 B2 | 1/2014 | Mitchell et al. |
| 8,643,216 B2 | 2/2014 | Lattin |
| 8,643,217 B2 | 2/2014 | Gietzold et al. |
| 8,670,225 B2 | 3/2014 | Nunes |
| 8,723,344 B1 | 5/2014 | Dierickx |
| 8,742,620 B1 | 6/2014 | Brennan et al. |
| 8,760,115 B2 | 6/2014 | Kinser et al. |
| 8,764,469 B2 | 7/2014 | Lamb |
| 8,767,379 B2 | 7/2014 | Whitaker |
| 8,818,588 B2 | 8/2014 | Ambrosio et al. |
| 8,862,356 B2 | 10/2014 | Miller |
| 8,912,683 B2 | 12/2014 | Dames et al. |
| 8,924,057 B2 | 12/2014 | Kinser et al. |
| 8,978,798 B2 | 5/2015 | Dalum et al. |
| 9,030,336 B2 | 5/2015 | Doyle |
| 9,061,680 B2 | 6/2015 | Dalum |
| 9,093,788 B2 | 7/2015 | Lamb |
| 9,102,241 B2 | 8/2015 | Brabee |
| 9,147,335 B2 | 9/2015 | Raghunathan et al. |
| 9,199,543 B2 | 12/2015 | Brabee |
| 9,313,616 B2 | 4/2016 | Mitchell et al. |
| 9,436,853 B1 | 9/2016 | Meyers |
| 9,440,507 B2 | 9/2016 | Giovanardi et al. |
| 9,463,681 B2 | 10/2016 | Olaleye et al. |
| 9,464,839 B2 | 10/2016 | Rusignuolo et al. |
| 9,557,100 B2 | 1/2017 | Chopko et al. |
| 9,562,715 B2 | 2/2017 | Kandasamy |
| 9,694,697 B2 | 7/2017 | Brabee |
| 9,738,160 B2 | 8/2017 | Bae et al. |
| 9,758,013 B2 | 9/2017 | Steele |
| 9,783,024 B2 | 10/2017 | Connell et al. |
| 9,784,780 B2 | 10/2017 | Loftus et al. |
| 9,825,549 B2 | 11/2017 | Choi et al. |
| 9,846,086 B1 | 12/2017 | Robinson et al. |
| 9,893,545 B2 | 2/2018 | Bean |
| 9,931,960 B2 | 4/2018 | Tabatowski-Bush et al. |
| 9,975,403 B2 | 5/2018 | Rusignuolo et al. |
| 9,975,446 B2 | 5/2018 | Weber et al. |
| 9,987,906 B2 | 6/2018 | Kennedy |
| 10,000,122 B2 | 6/2018 | Wu et al. |
| 10,148,212 B2 | 12/2018 | Schumacher et al. |
| 10,240,847 B1 | 3/2019 | Thomas, Jr. |
| 2002/0113576 A1 | 8/2002 | Oomura et al. |
| 2003/0043607 A1 | 3/2003 | Vinciarelli et al. |
| 2003/0106332 A1 | 6/2003 | Okamoto et al. |
| 2003/0200017 A1 | 10/2003 | Capps et al. |
| 2003/0201097 A1 | 10/2003 | Zeigler et al. |
| 2005/0057210 A1 | 3/2005 | Ueda et al. |
| 2005/0065684 A1 | 3/2005 | Larson et al. |
| 2006/0284601 A1 | 12/2006 | Salasoo et al. |
| 2007/0052241 A1 | 3/2007 | Pacy |
| 2007/0192116 A1 | 8/2007 | Levitt |
| 2008/0177678 A1 | 7/2008 | Di Martini et al. |
| 2008/0281473 A1 | 11/2008 | Pitt |
| 2009/0121798 A1 | 5/2009 | Levinson |
| 2009/0126901 A1 | 5/2009 | Hegar et al. |
| 2009/0178424 A1 | 7/2009 | Hwang et al. |
| 2009/0195349 A1 | 8/2009 | Frader-Thompson et al. |
| 2009/0314019 A1 | 12/2009 | Fujimoto et al. |
| 2009/0320515 A1 | 12/2009 | Bischofberger et al. |
| 2010/0045105 A1 | 2/2010 | Bovio et al. |
| 2010/0230224 A1 | 9/2010 | Hindman |
| 2010/0312425 A1 | 12/2010 | Obayashi et al. |
| 2010/0320018 A1 | 12/2010 | Gwozdek et al. |
| 2011/0000244 A1 | 1/2011 | Reason et al. |
| 2011/0114398 A1 | 5/2011 | Bianco |
| 2011/0118916 A1 | 5/2011 | Gullichsen |
| 2011/0162395 A1 | 7/2011 | Chakiachvili et al. |
| 2011/0208378 A1 | 8/2011 | Krueger et al. |
| 2011/0224841 A1 | 9/2011 | Profitt-Brown et al. |
| 2011/0241420 A1 | 10/2011 | Hering et al. |
| 2011/0290893 A1 | 12/2011 | Steinberg |
| 2012/0000212 A1 | 1/2012 | Sanders et al. |
| 2012/0116931 A1 | 5/2012 | Meyers |
| 2012/0153722 A1 | 6/2012 | Nazarian |
| 2012/0198866 A1 | 8/2012 | Zeidner |
| 2012/0310416 A1 | 12/2012 | Tepper et al. |
| 2013/0000342 A1 | 1/2013 | Blasko et al. |
| 2013/0088900 A1 | 4/2013 | Park |
| 2013/0158828 A1 | 6/2013 | McAlister |
| 2013/0231808 A1 | 9/2013 | Flath et al. |
| 2014/0018969 A1 | 1/2014 | Forbes, Jr. |
| 2014/0020414 A1 | 1/2014 | Rusignuolo et al. |

(56) References Cited

U.S. PATENT DOCUMENTS

| | | |
|---|---|---|
| 2014/0026599 A1 | 1/2014 | Rusignuolo et al. |
| 2014/0060097 A1 | 3/2014 | Perreault |
| 2014/0137590 A1 | 5/2014 | Chopko et al. |
| 2014/0230470 A1 | 8/2014 | Cook |
| 2014/0265560 A1 | 9/2014 | Leehey et al. |
| 2015/0019132 A1 | 1/2015 | Gusikhin et al. |
| 2015/0081212 A1 | 3/2015 | Mitchell et al. |
| 2015/0121923 A1 | 5/2015 | Rusignuolo et al. |
| 2015/0168032 A1 | 6/2015 | Steele |
| 2015/0188360 A1 | 7/2015 | Doane et al. |
| 2015/0316301 A1 | 11/2015 | Kolda et al. |
| 2015/0345958 A1 | 12/2015 | Graham |
| 2015/0355288 A1 | 12/2015 | Yokoyama et al. |
| 2015/0360568 A1 | 12/2015 | Champagne et al. |
| 2016/0011001 A1 | 1/2016 | Emory et al. |
| 2016/0035152 A1 | 2/2016 | Kargupta |
| 2016/0089994 A1 | 3/2016 | Keller et al. |
| 2016/0252289 A1 | 9/2016 | Feng et al. |
| 2016/0280040 A1 | 9/2016 | Connell et al. |
| 2016/0285416 A1 | 9/2016 | Tiwari et al. |
| 2016/0291622 A1 | 10/2016 | Al-Mohssen et al. |
| 2016/0327921 A1 | 11/2016 | Ribbich et al. |
| 2016/0377309 A1 | 12/2016 | Abiprojo et al. |
| 2017/0030728 A1 | 2/2017 | Baglino et al. |
| 2017/0057323 A1 | 3/2017 | Neu et al. |
| 2017/0063248 A1 | 3/2017 | Lee et al. |
| 2017/0098954 A1 | 4/2017 | Ferguson et al. |
| 2017/0217280 A1 | 8/2017 | Larson et al. |
| 2017/0259764 A1 | 9/2017 | Da Silva Carvalho et al. |
| 2017/0302200 A1 | 10/2017 | Marcinkiewicz |
| 2017/0349078 A1 | 12/2017 | Dziuba et al. |
| 2018/0001731 A1* | 1/2018 | Vehr ................. B60H 1/3211 |
| 2018/0022187 A1 | 1/2018 | Connell et al. |
| 2018/0029436 A1 | 2/2018 | Zaeri et al. |
| 2018/0029488 A1 | 2/2018 | Sjödin |
| 2018/0087813 A1 | 3/2018 | Sent, Jr. |
| 2018/0111441 A1 | 4/2018 | Menard et al. |
| 2018/0154723 A1 | 6/2018 | Anderson et al. |
| 2018/0201092 A1 | 7/2018 | Ahuja et al. |
| 2018/0203443 A1 | 7/2018 | Newman |
| 2018/0222278 A1 | 8/2018 | Mizuma |
| 2018/0306533 A1 | 10/2018 | Alahyari et al. |
| 2018/0342876 A1 | 11/2018 | Agnew et al. |
| 2018/0342877 A1 | 11/2018 | Yoo et al. |
| 2018/0356870 A1 | 12/2018 | Rusignuolo |
| 2019/0047496 A1 | 2/2019 | Sufrin-Disler et al. |
| 2019/0086138 A1 | 3/2019 | Chopko et al. |
| 2019/0092122 A1 | 3/2019 | Vanous et al. |
| 2019/0123544 A1 | 4/2019 | Pelegris et al. |
| 2019/0184838 A1 | 6/2019 | Lee et al. |
| 2019/0255914 A1 | 8/2019 | Ikeda et al. |
| 2019/0283541 A1 | 9/2019 | Adetola et al. |
| 2020/0050753 A1 | 2/2020 | Davis et al. |
| 2020/0086744 A1 | 3/2020 | Schumacher et al. |
| 2020/0101820 A1 | 4/2020 | Wenger et al. |
| 2020/0130471 A1 | 4/2020 | Leasure |
| 2020/0130473 A1 | 4/2020 | Schumacher et al. |
| 2020/0136504 A1 | 4/2020 | Schumacher et al. |
| 2020/0207184 A1 | 7/2020 | Schumacher et al. |

FOREIGN PATENT DOCUMENTS

| | | | |
|---|---|---|---|
| CN | 2912069 | | 6/2007 |
| CN | 101713577 | | 5/2010 |
| CN | 202038315 | | 11/2011 |
| CN | 104539184 | | 4/2015 |
| CN | 104734178 | | 6/2015 |
| CN | 105711376 | | 6/2016 |
| CN | 106184252 | | 12/2016 |
| CN | 106766419 | | 5/2017 |
| CN | 106774131 | | 5/2017 |
| CN | 108074466 | | 5/2018 |
| CN | 108931006 | | 12/2018 |
| CN | 208306320 | | 1/2019 |
| CN | 208650989 | | 3/2019 |
| DE | 3817365 | | 11/1989 |
| DE | 29715576 | | 12/1997 |
| DE | 10138750 | | 2/2003 |
| DE | 10200637 | | 10/2003 |
| DE | 102011050719 | | 12/2012 |
| EP | 0282051 | | 9/1988 |
| EP | 1935712 | | 6/2008 |
| EP | 2365915 | | 9/2011 |
| EP | 2689944 | | 1/2014 |
| EP | 2717016 | | 9/2014 |
| EP | 2942216 | | 11/2015 |
| EP | 3343728 | | 7/2018 |
| EP | 2768693 | | 5/2019 |
| EP | 536552 | | 9/2019 |
| EP | 3540340 | | 9/2019 |
| GB | 2551999 | | 1/2018 |
| JP | 2000158930 | | 6/2000 |
| JP | 2007320352 | | 12/2007 |
| JP | 2009243780 | | 10/2009 |
| JP | 2019145521 | | 8/2019 |
| KR | 10-2012-0092834 | | 8/2012 |
| SE | 1630043 | * | 9/2017 |
| SE | 541327 | * | 7/2019 |
| WO | 03038988 | | 5/2003 |
| WO | 2008/153518 | | 12/2008 |
| WO | 2009/155941 | | 12/2009 |
| WO | 2010065476 | | 6/2010 |
| WO | 2011066468 | | 6/2011 |
| WO | 2012/138500 | | 10/2012 |
| WO | 2012138497 | | 10/2012 |
| WO | 2013096084 | | 6/2013 |
| WO | 2014002244 | | 1/2014 |
| WO | 2014058610 | | 4/2014 |
| WO | 2014085672 | | 6/2014 |
| WO | 2014106060 | | 7/2014 |
| WO | 2014106068 | | 7/2014 |
| WO | 2016/038838 | | 3/2016 |
| WO | 2016145107 | | 9/2016 |
| WO | 2017058660 | | 4/2017 |
| WO | 2017/083333 | | 5/2017 |
| WO | 2017/083336 | | 5/2017 |
| WO | 2017/151698 | | 9/2017 |
| WO | 2017172484 | | 10/2017 |
| WO | 2017172855 | | 10/2017 |
| WO | 2017176682 | | 10/2017 |
| WO | 2017176725 | | 10/2017 |
| WO | 2017176729 | | 10/2017 |
| WO | 2017189485 | | 11/2017 |
| WO | 2017218909 | | 12/2017 |
| WO | 2017218910 | | 12/2017 |
| WO | 2017218912 | | 12/2017 |
| WO | 2018/017450 | | 1/2018 |
| WO | 2018009646 | | 1/2018 |
| WO | 2018009798 | | 1/2018 |
| WO | 2018017818 | | 1/2018 |
| WO | 2018029502 | | 2/2018 |
| WO | 2018226389 | | 12/2018 |
| WO | 2018226649 | | 12/2018 |
| WO | 2018226848 | | 12/2018 |
| WO | 2018226857 | | 12/2018 |
| WO | 2018226862 | | 12/2018 |
| WO | 2018226906 | | 12/2018 |
| WO | 2018226981 | | 12/2018 |
| WO | 2018226986 | | 12/2018 |
| WO | 2019051086 | | 3/2019 |
| WO | 2019151947 | | 8/2019 |
| WO | 2020068446 | | 4/2020 |
| WO | 2020068450 | | 4/2020 |
| WO | 2020068469 | | 4/2020 |
| WO | 2020068475 | | 4/2020 |
| WO | 2020068502 | | 4/2020 |
| WO | 2020068556 | | 4/2020 |
| WO | 2020068641 | | 4/2020 |
| WO | 2020068646 | | 4/2020 |
| WO | 2020069107 | | 4/2020 |

OTHER PUBLICATIONS

Yang et al., "The Role of Thermal Plume in Person-to-Person

(56) References Cited

OTHER PUBLICATIONS

Contaminant Cross Transmission", 2017 Winter Conference, Seminar 36; Modeling and Control of the Personal Microenvironment, 5 pages.
"Lamberet Smart Reefer on Solutrans", ZOEKEN, Jul. 28, 2015, 7 pages, available at: https://iepieleaks.nl/lamberet-smart-reefer-solutrans/.
U.S. Appl. No. 16/178,067, titled "Methods and Systems for Generation and Utilization of Supplemental Stored Energy for Use in Transport Climate Control", filed Nov. 1, 2018, 35 pages.
U.S. Appl. No. 16/565,063, titled "System and Method for Managing Power and Efficiently Sourcing a Variable Voltage for a Transport Climate Control System ", filed Sep. 9, 2019, 59 pages.
U.S. Appl. No. 16/574,754, titled "Methods and Systems for Energy Management of a Transport Climate Control System", filed Sep. 18, 2019, 50 pages.
U.S. Appl. No. 16/574,775, titled "Methods and Systems for Power and Load Management of a Transport Climate Control System", filed Sep. 18, 2019, 68 pages.
European Patent Application No. 18382672.6, titled "Methodsand Systems for Energy Management of a Transport Climate Control System", filed Sep. 19, 2018, 50 pages.
European Patent Application No. 18382673.4 titled "Methods and Systems for Power and Load Management of a Transport Climate Control System", filed Sep. 19, 2018, 68 pages.
U.S. Appl. No. 16/176,802, titled "Methods and Systems for Controlling a Mild Hybrid System That Powers a Transport Climate Control System", filed Oct. 31, 2018, 31 pages.
U.S. Appl. No. 16/236,938, titled "Systems and Methods for Smart Load Shedding of a Transport Vehicle While in Transit", filed Dec. 31, 2018, 39 pages.
U.S. Appl. No. 16/176,720, titled "Methods and Systems for Augmenting a Vehicle Powered Transport Climate Control System", filed Oct. 31, 2018, 41 pages.
U.S. Appl. No. 16/176,602, titled "Reconfigurable Utility Power Input With Passive Voltage Booster", filed Oct. 31, 2018, 39 pages.
U.S. Appl. No. 16/147,704, titled "Methods and Systems for Monitoring and Displaying Energy Use and Energy Cost of a Transport Vehicle Climate Control System or a Fleet of Transport Vehicle Climate Control Systems", filed Sep. 29, 2018, 33 pages.
U.S. Appl. No. 16/235,865, titled "Methods and Systems for Preserving Autonomous Dperation of a Transport Climate Control System", filed Dec. 28, 2018, 41 pages.
PCT International Application No. PCT/US2018/068136, titled "Methods and Systems for Providing Predictive Energy Consumption Feedback for Powering a Transport Climate Control System", filed Dec. 31, 2018, 34 pages.
PCT International Application No. PCT/US2018/068129, titled "Methods and Systems for Notifying and Mitigating a Suboptimal Event Occurring in a Transport Climate Control System", filed Dec. 31, 2018, 44 pages.
PCT International Application No. PCT/US2018/068139, titled "Methods and Systems for Providing Feedback for a Transport Climate Control System", filed Dec. 31, 2018, 37 pages.
PCT International Application No. PCT/US2018/068142, titled "Methods and Systems for Providing Predictive Energy Consumption Feedback for Powering a Transport Climate Control System Using External Data", filed Dec. 31, 2018, 39 pages.
U.S. Appl. No. 16/911,692, titled "Climate Controlled Vehicle, Transport Climate Control Equipment, Method of Retrofitting a Vehicle and Method of Operation", filed Jun. 25, 2020, 39 pages.
U.S. Appl. No. 16/565,110, titled "Transport Climate Control System With a Selfconfiguring Matrix Power Converter", filed Sep. 9, 2019, 52 pages.
U.S. Appl. No. 16/565,146, titled "Optimized Power Management for a Transport Climate Control Energy Source", filed Sep. 9, 2019, 53 pages.
U.S. Appl. No. 62/897,833, titled "Optimized Power Distribution to Transport Climate Control Systems Amongst One or More Electric Supply Equipment Stations", filed Sep. 9, 2019, 41 pages.
European Patent Application No. 19382776.3, titled "Mprioritized Power Delivery for Facilitating Transport Climate Control", filed Sep. 9, 2019, 41 pages.
U.S. Appl. No. 16/565,205, titled "Transport Climate Control System With an Accessory Power Distribution Unit for Managing Transport Climate Control Loads", filed Sep. 9, 2019, 54 pages.
U.S. Appl. No. 16/565,235, titled "Interface System for Connecting a Vehicle and a Transport Climate Control System", filed Sep. 9, 2019, 64 pages.
U.S. Appl. No. 16/565,252, titled "Demand-Side Power Distribution Management for a Plurality of Transport Climate Control Systems", filed Sep. 9, 2019, 44 pages.
U.S. Appl. No. 16/565,282, titled "Optimized Power Cord for Transferring Power to a Transport Climate Control System", filed Sep. 9, 2019, 43 pages.
U.S. Appl. No. 16/147,708, titled "Methods and Systems for Autonomous Climate Control Optimization of a Transport Vehicle", filed Sep. 29, 2018, 41 pages.
U.S. Appl. No. 16/176,667, titled "Drive Off Protection System and Method for Preventing Drive Off", filed Oct. 31, 2018, 41 pages.
U.S. Appl. No. 16/730,126, titled "Transport Climate Control System Power Architecture", filed Dec. 30, 2019, 27 pages.
U.S. Appl. No. 17/015,194, titled "Prioritized Power Delivery for Facilitating Transport Climate Control", filed Sep. 9, 2020, 41 pages.

\* cited by examiner

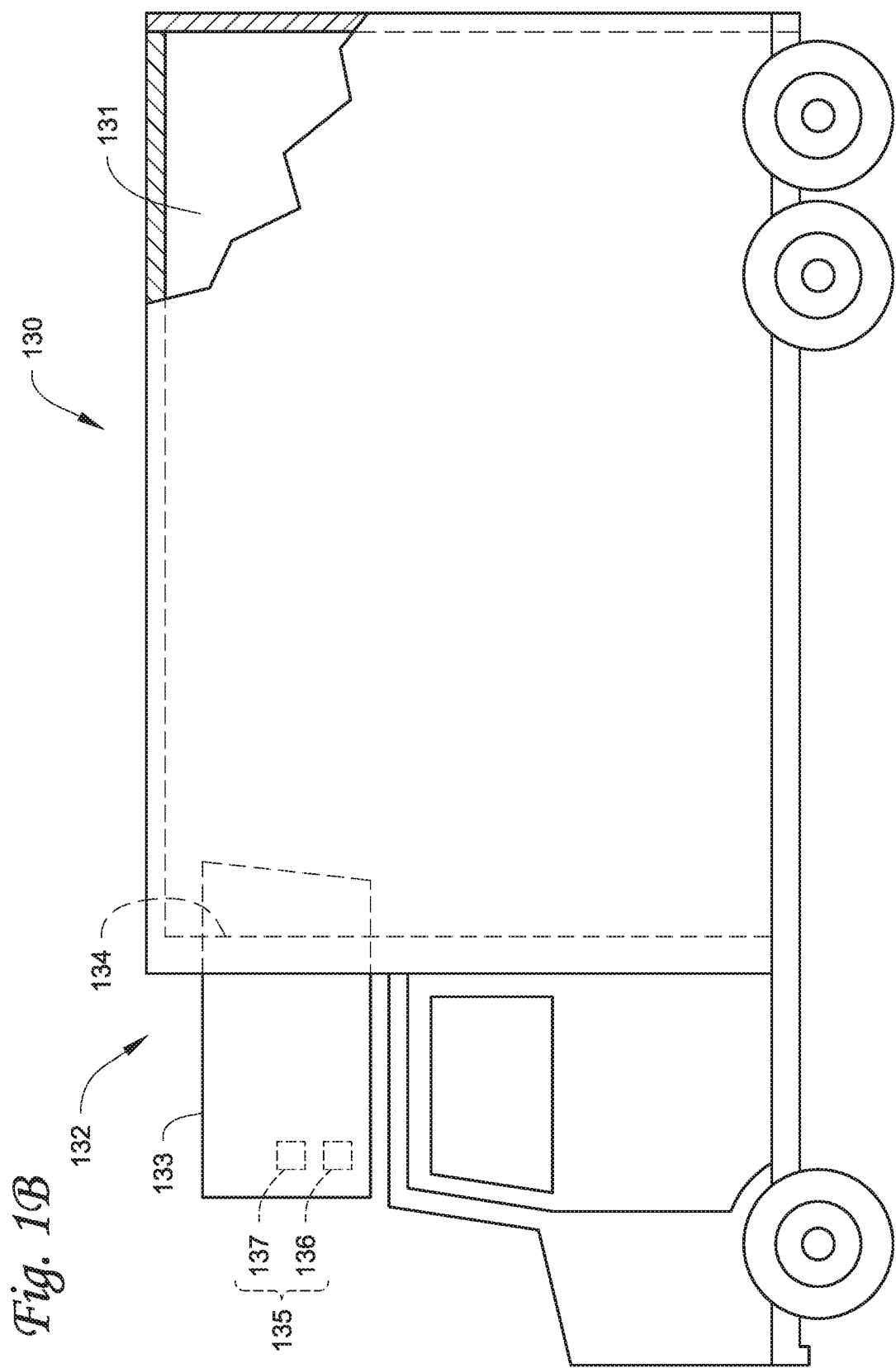

1

OPTIMIZED POWER DISTRIBUTION TO TRANSPORT CLIMATE CONTROL SYSTEMS AMONGST ONE OR MORE ELECTRIC SUPPLY EQUIPMENT STATIONS

FIELD

The disclosure herein relates to an electrically powered accessory configured to be used with at least one of a vehicle, trailer, and a transport container. More particularly, the disclosure herein relates to an optimized power distribution to electrically powered accessories amongst one or more electric supply equipment stations.

BACKGROUND

A transport climate control system is generally used to control environmental condition(s) (e.g., temperature, humidity, air quality, and the like) within a climate controlled space of a transport unit (e.g., a truck, a container (such as a container on a flat car, an intermodal container, etc.), a box car, a semi-tractor, a bus, or other similar transport unit). The transport climate control system can include, for example, a transport refrigeration system (TRS) and/or a heating, ventilation and air conditioning (HVAC) system. The TRS can control environmental condition(s) within the climate controlled space to maintain cargo (e.g., produce, frozen foods, pharmaceuticals, etc.). The HVAC system can control environmental conditions(s) within the climate controlled space to provide passenger comfort for passengers travelling in the transport unit. In some transport units, the transport climate control system can be installed externally (e.g., on a rooftop of the transport unit, on a front wall of the transport unit, etc.).

SUMMARY

The embodiments disclosed herein relate to an electrically powered accessory configured to be used with at least one of a vehicle, trailer, and a transport container. More particularly, the embodiments disclosed herein relate to an optimized power distribution to electrically powered accessories amongst one or more electric supply equipment stations.

In particular, the embodiments described herein can power and/or charge one or more electrically powered accessories and at the same time maintain logistical processes for operating the one or more electrically powered accessories and maintain dispatch schedules for the one or more electrically powered accessories while minimizing costs related to, for example, power demand rates, etc.

For example, the embodiments described herein can coordinate power distribution to one or more electrically powered accessories at a power distribution site based on infrastructure data about the power distribution site, vehicle/electrically powered accessory data from one or more electrically powered accessories demanding power from one or more electrical supply equipment (ESE) stations (e.g., electrical vehicle supply equipment) located at the power distribution site, and external data from an external source that can impact power demand from the one or more electrically powered accessories. The infrastructure data, the electrically powered accessory data, and the external data can be from various inputs and use simulation models and historical data to predict an optimization model for scheduling power distribution to the one or more electrically powered accessories while minimizing overall cost (e.g., power distribution site costs, operational costs of the electrically powered accessories, etc.) and ensuring that the electrically powered accessories have sufficient power to operate while at the power distribution site and/or sufficient charge to operate when the electrically powered accessory is dispatched from the power distribution site.

In some embodiments, the power distribution site can be modular such that power distribution capacity can be increased or decreased as required and can be flexible such that the power distribution site includes multiple ESE stations that may or may not be capable of distributing power at any given time. Also, in some embodiments, the power distribution site can determine whether a new ESE station has been added to or removed from the power distribution site. Accordingly, the embodiment described herein can reduce costs for a power distribution site by reducing the amount of power distributed at peak power demand rates, can reduce capacity strain on the power distribution site and can enable energy balancing amongst the multiple ESE stations.

When the electrically powered accessories are CCUs, the embodiments described herein can ensure climate control for each of the CCUs, and optimize timing for starting, for example, a temperature pull down for each of the CCUs and/or speed for the temperature pull down for each of the CCUs. The embodiments described herein can help ensure successful climate control of each of the CCUs and provide particular focus to the CCUs providing climate control to relatively more valuable and/or climate sensitive cargo.

In one embodiment, a method for optimizing power distribution amongst one or more electrical supply equipment stations at a power distribution site is provided. The method includes obtaining infrastructure data about the power distribution site, obtaining vehicle/electrically powered accessory data from one or more electrically powered accessories and one or more vehicles demanding power from the one or more electrical supply equipment, and obtaining external data from an external source that can impact power demand from the one or more electrically powered accessories. Each of the one or more electrically powered accessories is configured to be used with at least one of a vehicle, a trailer, and a transportation container. The method also includes generating an optimized power distribution schedule based on the infrastructure data, the vehicle/electrically powered accessory data and the external data, and distributing power to the one or more electrically powered accessories based on the optimized power distribution schedule.

In another embodiment, a power distribution site for distributing power to one or more electrically powered accessories is provided. The power distribution site includes a power converter stage, a plurality of electrical supply equipment stations, a transfer switch matrix, and a power distribution controller. The power converter stage is configured to convert power received from one or more of a plurality of power sources into a power that is compatible with at least one of the one or more electrically powered accessories. The plurality of electrical supply equipment stations distribute power received from the power converter stage to at least one of the one or more electrically powered accessories. The transfer switch matrix is selectively connected to each of the plurality of electrical supply equipment stations, wherein the transfer switch matrix selectively distributes power converted by the power converter stage to at least one of the one or more electrically powered accessories. The power distribution controller controls distribution of power to the one or more electrically powered accessories by controlling operation of the power converter stage and the transfer switch matrix.

Other features and aspects will become apparent by consideration of the following detailed description and accompanying drawings.

BRIEF DESCRIPTION OF THE DRAWINGS

FIG. 1B illustrates a side view of a truck with a transport climate control system, according to one embodiment.

Like reference numbers represent like parts throughout.

DETAILED DESCRIPTION

Figure 1A:
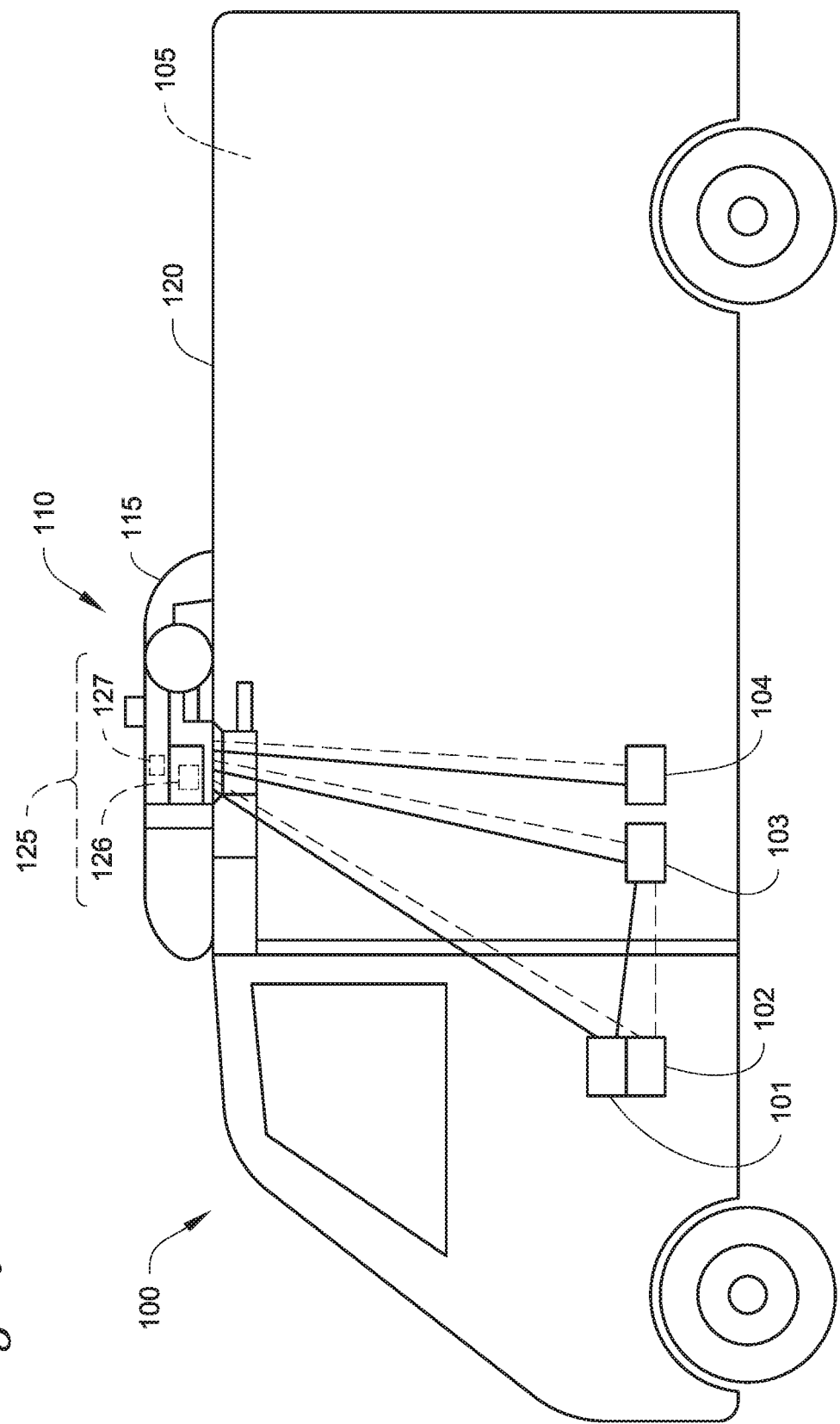
FIG. 1A illustrates a side view of a van with a transport climate control system, according to one embodiment.

The embodiments disclosed herein relate to an electrically powered accessory configured to be used with at least one of a vehicle, trailer, and a transport container. More particularly, the embodiments disclosed herein relate to optimized power distribution to electrically powered accessories amongst one or more electric supply equipment stations.

It is noted that: U.S. application Ser. No. 16/565063, "SYSTEM AND METHOD FOR MANAGING POWER AND EFFICIENTLY SOURCING A VARIABLE VOLTAGE FOR A TRANSPORT CLIMATE CONTROL SYSTEM,"; U.S. application Ser. No. 16/565110, "TRANSPORT CLIMATE CONTROL SYSTEM WITH A SELF-CONFIGURING MATRIX POWER CONVERTER,"; U.S. application Ser. No. 16/565146, "OPTIMIZED POWER MANAGEMENT FOR A TRANSPORT CLIMATE CONTROL ENERGY SOURCE,"; European Patent Application Number 19219088.2, "PRIORITIZED POWER DELIVERY FOR FACILITATING TRANSPORT CLIMATE CONTROL,"; U.S. application Ser. No. 16/565205, "TRANSPORT CLIMATE CONTROL SYSTEM WITH AN ACCESSORY POWER DISTRIBUTION UNIT FOR MANAGING TRANSPORT CLIMATE CONTROL ELECTRICALLY POWERED ACCESSORY LOADS,"; U.S. application Ser. No. 16/565235, "AN INTERFACE SYSTEM FOR CONNECTING A VEHICLE AND A TRANSPORT CLIMATE CONTROL SYSTEM,"; U.S. application Ser. No. 16/565252, "DEMAND-SIDE POWER DISTRIBUTION MANAGEMENT FOR A PLURALITY OF TRANSPORT CLIMATE CONTROL SYSTEMS,"; and U.S. application Ser. No. 16/565282, "OPTIMIZED POWER CORD FOR TRANSFERRING POWER TO A TRANSPORT CLIMATE CONTROL SYSTEM,"; all filed concurrently herewith on Sep. 9, 2019, and the contents of which are incorporated herein by reference. While the embodiments described below illustrate different embodiments of a transport climate control system, it will be appreciated that the electrically powered accessory is not limited to the transport climate control system or a climate control unit (CCU) of the transport climate control system. It will be appreciated that a CCU can be e.g., a transport refrigeration unit (TRU). In other embodiments, the electrically powered accessory can be, for example, a crane attached to a vehicle, a cement mixer attached to a truck, one or more food appliances of a food truck, a boom arm attached to a vehicle, a concrete pumping truck, a refuse truck, a fire truck (with a power driven ladder, pumps, lights, etc.), etc. It will be appreciated that the electrically powered accessory may require continuous operation even when the vehicle's ignition is turned off and/or the vehicle is parked and/or idling and/or charging. The electrically powered accessory can require substantial power to operate and/or continuous and/or autonomous operation (e.g., controlling temperature/humidity/airflow of a climate controlled space) on an as needed basis, independent of the vehicle's operational mode.

While the embodiments described below illustrate different embodiments of a transport climate control system, it will be appreciated that the electrically powered accessory is not limited to the transport climate control system or a climate control unit (CCU) of the transport climate control system. It will be appreciated that a CCU can be e.g., a transport refrigeration unit (TRU). In other embodiments, the electrically powered accessory can be, for example, a crane attached to a vehicle, a cement mixer attached to a truck, one or more food appliances of a food truck, a boom arm attached to a vehicle, a concrete pumping truck, a refuse truck, a fire truck (with a power driven ladder, pumps, lights, etc.), etc. It will be appreciated that the electrically powered accessory may require continuous operation even when the vehicle's ignition is turned off and/or the vehicle is parked and/or idling and/or charging. The electrically powered accessory can require substantial power to operate and/or continuous and/or autonomous operation (e.g., controlling temperature/humidity/airflow of a climate controlled space) on an as needed basis, independent of the vehicle's operational mode.

FIG. 1A depicts a climate-controlled van 100 that includes a climate controlled space 105 for carrying cargo and a transport climate control system 110 for providing climate control within the climate controlled space 105. The transport climate control system 110 includes a climate control unit (CCU) 115 that is mounted to a rooftop 120 of the van 100. The transport climate control system 110 can include, amongst other components, a climate control circuit (not shown) that connects, for example, a compressor, a condenser, an evaporator and an expansion device to provide climate control within the climate controlled space 105. It will be appreciated that the embodiments described herein are not limited to climate-controlled vans, but can apply to any type of transport unit (e.g., a truck, a container (such as a container on a flat car, an intermodal container, a marine container, etc.), a box car, a semi-tractor, a bus, or other similar transport unit), etc.

The transport climate control system 110 also includes a programmable climate controller 125 and one or more sensors (not shown) that are configured to measure one or more parameters of the transport climate control system 110 (e.g., an ambient temperature outside of the van 100, an ambient humidity outside of the van 100, a compressor suction pressure, a compressor discharge pressure, a supply air temperature of air supplied by the CCU 115 into the climate controlled space 105, a return air temperature of air returned from the climate controlled space 105 back to the CCU 115, a humidity within the climate controlled space 105, etc.) and communicate parameter data to the climate controller 125. The climate controller 125 is configured to control operation of the transport climate control system 110 including the components of the climate control circuit. The climate controller unit 115 may comprise a single integrated control unit 126 or may comprise a distributed network of climate controller elements 126, 127. The number of distributed control elements in a given network can depend upon the particular application of the principles described herein.

The climate-controlled van 100 can also include a vehicle PDU 101, a VES 102, a standard charging port 103, and/or an enhanced charging port 104. The VES 102 can include a controller (not shown). The vehicle PDU 101 can include a controller (not shown). In one embodiment, the vehicle PDU controller can be a part of the VES controller or vice versa. In one embodiment, power can be distributed from e.g., an electric vehicle supply equipment (EVSE, not shown), via the standard charging port 103, to the vehicle PDU 101. Power can also be distributed from the vehicle PDU 101 to an electrical supply equipment (ESE, not shown) and/or to the CCU 115 (see solid lines for power lines and dotted lines for communication lines). In another embodiment, power can be distributed from e.g., an EVSE (not shown), via the enhanced charging port 104, to an ESE (not shown) and/or to the CCU 115. The ESE can then distribute power to the vehicle PDU 101 via the standard charging port 103.

FIG. 1B depicts a climate-controlled straight truck 130 that includes a climate controlled space 131 for carrying cargo and a transport climate control system 132. The transport climate control system 132 includes a CCU 133 that is mounted to a front wall 134 of the climate controlled space 131. The CCU 133 can include, amongst other components, a climate control circuit (not shown) that connects, for example, a compressor, a condenser, an evaporator and an expansion device to provide climate control within the climate controlled space 131.

The transport climate control system 132 also includes a programmable climate controller 135 and one or more sensors (not shown) that are configured to measure one or more parameters of the transport climate control system 132 (e.g., an ambient temperature outside of the truck 130, an ambient humidity outside of the truck 130, a compressor suction pressure, a compressor discharge pressure, a supply air temperature of air supplied by the CCU 133 into the climate controlled space 131, a return air temperature of air returned from the climate controlled space 131 back to the CCU 133, a humidity within the climate controlled space 131, etc.) and communicate parameter data to the climate controller 135. The climate controller 135 is configured to control operation of the transport climate control system 132 including components of the climate control circuit. The climate controller 135 may comprise a single integrated control unit 136 or may comprise a distributed network of climate controller elements 136, 137. The number of distributed control elements in a given network can depend upon the particular application of the principles described herein.

It will be appreciated that similar to the climate-controlled van 100 shown in FIG. 1A, the climate-controlled straight truck 130 of FIG. 1B can also include a vehicle PDU (such as the vehicle PDU 101 shown in FIG. 1A), a VES (such as the VES 102 shown in FIG. 1A), a standard charging port (such as the standard charging port 103 shown in FIG. 1A), and/or an enhanced charging port (e.g., the enhanced charging port 104 shown in FIG. 1A), communicating with and distribute power from/to the corresponding ESE and/or the CCU 133.

Figure 1C:
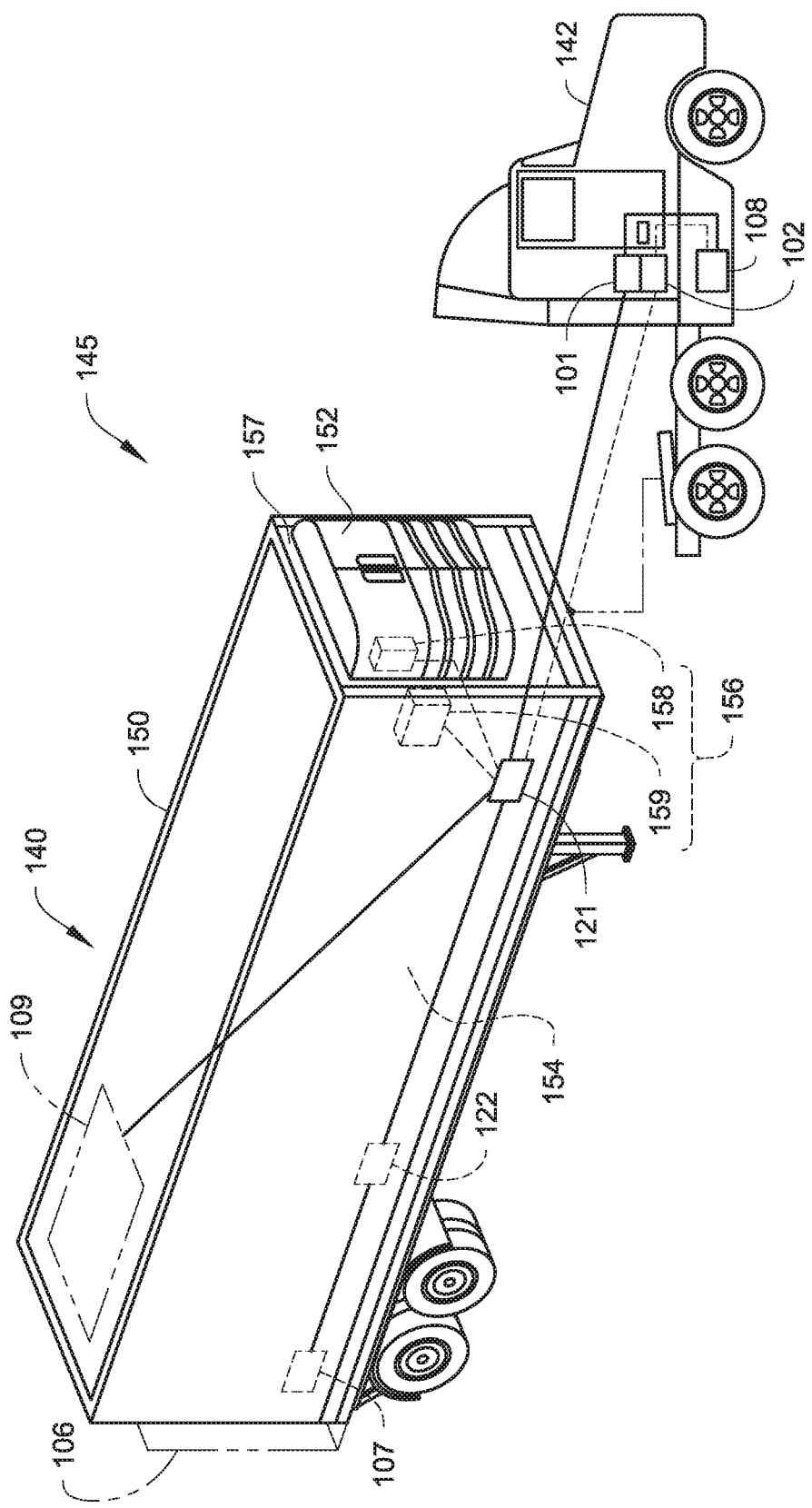
FIG. 1C illustrates a perspective view of a climate controlled transport unit, with a transport climate control system, attached to a tractor, according to one embodiment.

FIG. 1C illustrates one embodiment of a climate controlled transport unit 140 attached to a tractor 142. The climate controlled transport unit 140 includes a transport climate control system 145 for a transport unit 150. The tractor 142 is attached to and is configured to tow the transport unit 150. The transport unit 150 shown in FIG. 1C is a trailer.

The transport climate control system 145 includes a CCU 152 that provides environmental control (e.g. temperature, humidity, air quality, etc.) within a climate controlled space 154 of the transport unit 150. The CCU 152 is disposed on a front wall 157 of the transport unit 150. In other embodiments, it will be appreciated that the CCU 152 can be disposed, for example, on a rooftop or another wall of the transport unit 150. The CCU 152 includes a climate control circuit (not shown) that connects, for example, a compressor, a condenser, an evaporator and an expansion device to provide conditioned air within the climate controlled space 154.

The transport climate control system 145 also includes a programmable climate controller 156 and one or more sensors (not shown) that are configured to measure one or more parameters of the transport climate control system 145 (e.g., an ambient temperature outside of the transport unit 150, an ambient humidity outside of the transport unit 150, a compressor suction pressure, a compressor discharge pressure, a supply air temperature of air supplied by the CCU 152 into the climate controlled space 154, a return air temperature of air returned from the climate controlled space 154 back to the CCU 152, a humidity within the climate controlled space 154, etc.) and communicate parameter data to the climate controller 156. The climate controller 156 is configured to control operation of the transport climate control system 145 including components of the climate control circuit. The climate controller 156 may comprise a single integrated control unit 158 or may comprise a distributed network of climate controller elements 158, 159. The number of distributed control elements in a given network can depend upon the particular application of the principles described herein.

In some embodiments, the tractor 142 can include an optional APU 108. The optional APU 108 can be an electric auxiliary power unit (eAPU). Also, in some embodiments, the tractor 142 can also include a vehicle PDU 101 and a VES 102 (not shown). The APU 108 can provide power to the vehicle PDU 101 for distribution. It will be appreciated that for the connections, solid lines represent power lines and dotted lines represent communication lines. The climate controlled transport unit 140 can include a PDU 121 connecting to power sources (including, for example, an optional solar power source 109; an optional power source 122 such as Genset, fuel cell, undermount power unit, auxiliary battery pack, etc.; and/or an optional liftgate battery 107, etc.) of the climate controlled transport unit 140. The PDU 121 can include a PDU controller (not shown). The PDU controller can be a part of the climate controller 156. The PDU 121 can distribute power from the power sources of the climate controlled transport unit 140 to e.g., the transport climate control system 145. The climate controlled transport unit 140 can also include an optional liftgate 106. The optional liftgate battery 107 can provide power to open and/or close the liftgate 106.

It will be appreciated that similar to the climate-controlled van 100, the climate controlled transport unit 140 attached to the tractor 142 of FIG. 1C can also include a VES (such as the VES 102 shown in FIG. 1A), a standard charging port (such as the standard charging port 103 shown in FIG. 1A), and/or an enhanced charging port (such as the enhanced charging port 104 shown in FIG. 1A), communicating with and distribute power from/to a corresponding ESE and/or the CCU 152. It will be appreciated that the charging port(s) 103 and/or can be on either the tractor 142 or the trailer. For example, in one embodiment, the standard charging port 103 is on the tractor 142 and the enhanced charging port 104 is on the trailer.

Figure 1D:
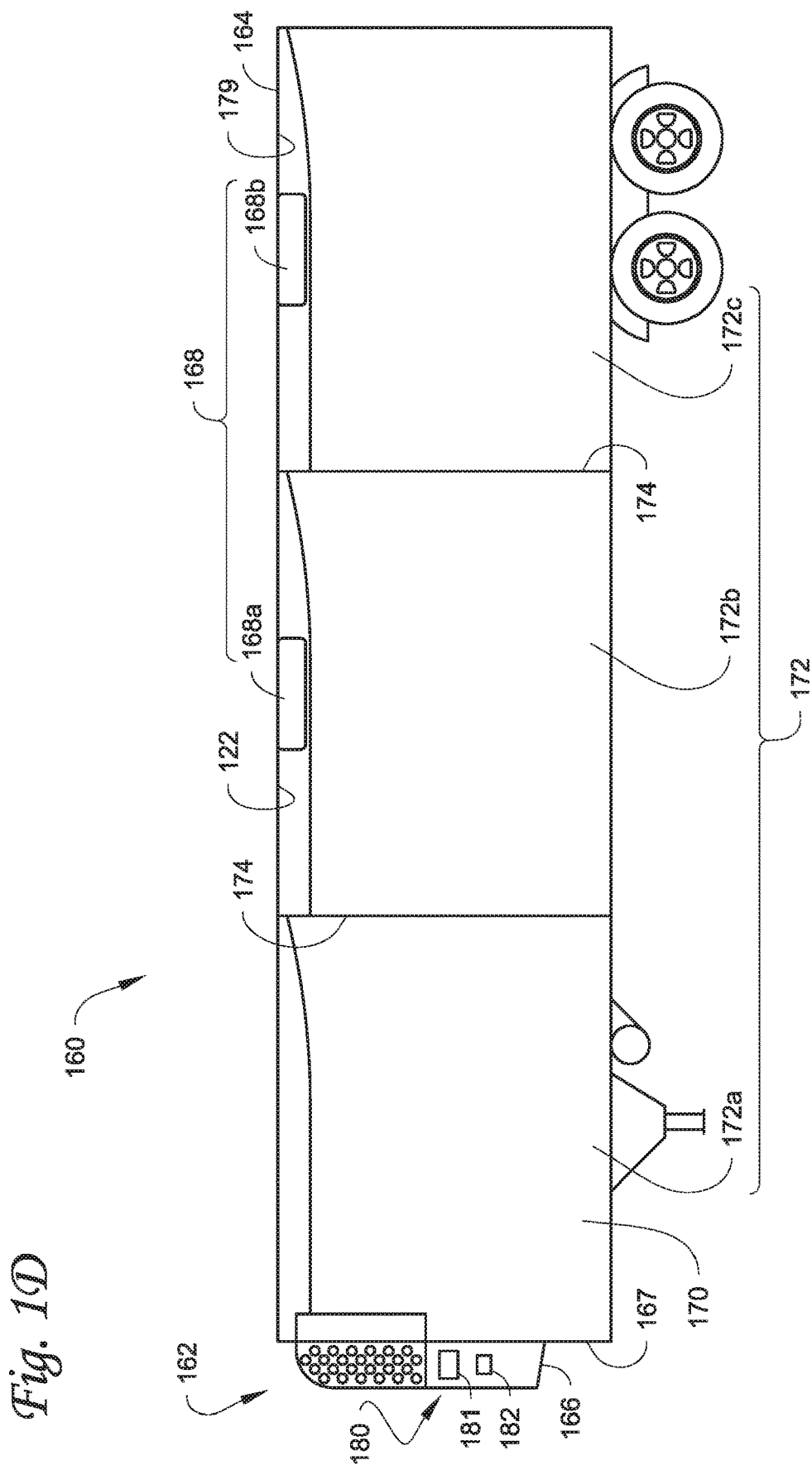
FIG. 1D illustrates a side view of a climate controlled transport unit with a multi-zone transport climate control system, according to one embodiment.

FIG. 1D illustrates another embodiment of a climate controlled transport unit 160. The climate controlled transport unit 160 includes a multi-zone transport climate control system (MTCS) 162 for a transport unit 164 that can be towed, for example, by a tractor (not shown). It will be appreciated that the embodiments described herein are not limited to tractor and trailer units, but can apply to any type of transport unit (e.g., a truck, a container (such as a container on a flat car, an intermodal container, a marine container, etc.), a box car, a semi-tractor, a bus, or other similar transport unit), etc.

The MTCS 162 includes a CCU 166 and a plurality of remote units 168 that provide environmental control (e.g. temperature, humidity, air quality, etc.) within a climate controlled space 170 of the transport unit 164. The climate controlled space 170 can be divided into a plurality of zones 172. The term "zone" means a part of an area of the climate controlled space 170 separated by walls 174. The CCU 166 can operate as a host unit and provide climate control within a first zone 172*a* of the climate controlled space 166. The remote unit 168*a* can provide climate control within a second zone 172*b* of the climate controlled space 170. The remote unit 168*b* can provide climate control within a third zone 172*c* of the climate controlled space 170. Accordingly, the MTCS 162 can be used to separately and independently control environmental condition(s) within each of the multiple zones 172 of the climate controlled space 162.

The CCU 166 is disposed on a front wall 167 of the transport unit 160. In other embodiments, it will be appreciated that the CCU 166 can be disposed, for example, on a rooftop or another wall of the transport unit 160. The CCU 166 includes a climate control circuit (not shown) that connects, for example, a compressor, a condenser, an evaporator and an expansion device to provide conditioned air within the climate controlled space 170. The remote unit 168*a* is disposed on a ceiling 179 within the second zone 172*b* and the remote unit 168*b* is disposed on the ceiling 179 within the third zone 172*c*. Each of the remote units 168*a,b* include an evaporator (not shown) that connects to the rest of the climate control circuit provided in the CCU 166.

The MTCS 162 also includes a programmable climate controller 180 and one or more sensors (not shown) that are configured to measure one or more parameters of the MTCS 162 (e.g., an ambient temperature outside of the transport unit 164, an ambient humidity outside of the transport unit 164, a compressor suction pressure, a compressor discharge pressure, supply air temperatures of air supplied by the CCU 166 and the remote units 168 into each of the zones 172, return air temperatures of air returned from each of the zones 172 back to the respective CCU 166 or remote unit 168*a* or 168*b*, a humidity within each of the zones 118, etc.) and communicate parameter data to a climate controller 180. The climate controller 180 is configured to control operation of the MTCS 162 including components of the climate control circuit. The climate controller 180 may comprise a single integrated control unit 181 or may comprise a distributed network of climate controller elements 181, 182. The number of distributed control elements in a given network can depend upon the particular application of the principles described herein.

It will be appreciated that similar to the climate-controlled van 100, the climate controlled transport unit 160 of FIG. 1D can also include a vehicle PDU (such as the vehicle PDU 101 shown in FIG. 1A), a VES (such as the VES 102 shown in FIG. 1A), a standard charging port (such as the standard charging port 103 shown in FIG. 1A), and/or an enhanced charging port (e.g., the enhanced charging port 104 shown in FIG. 1A), communicating with and distribute power from/to the corresponding ESE and/or the CCU 166.

Figure 1E:
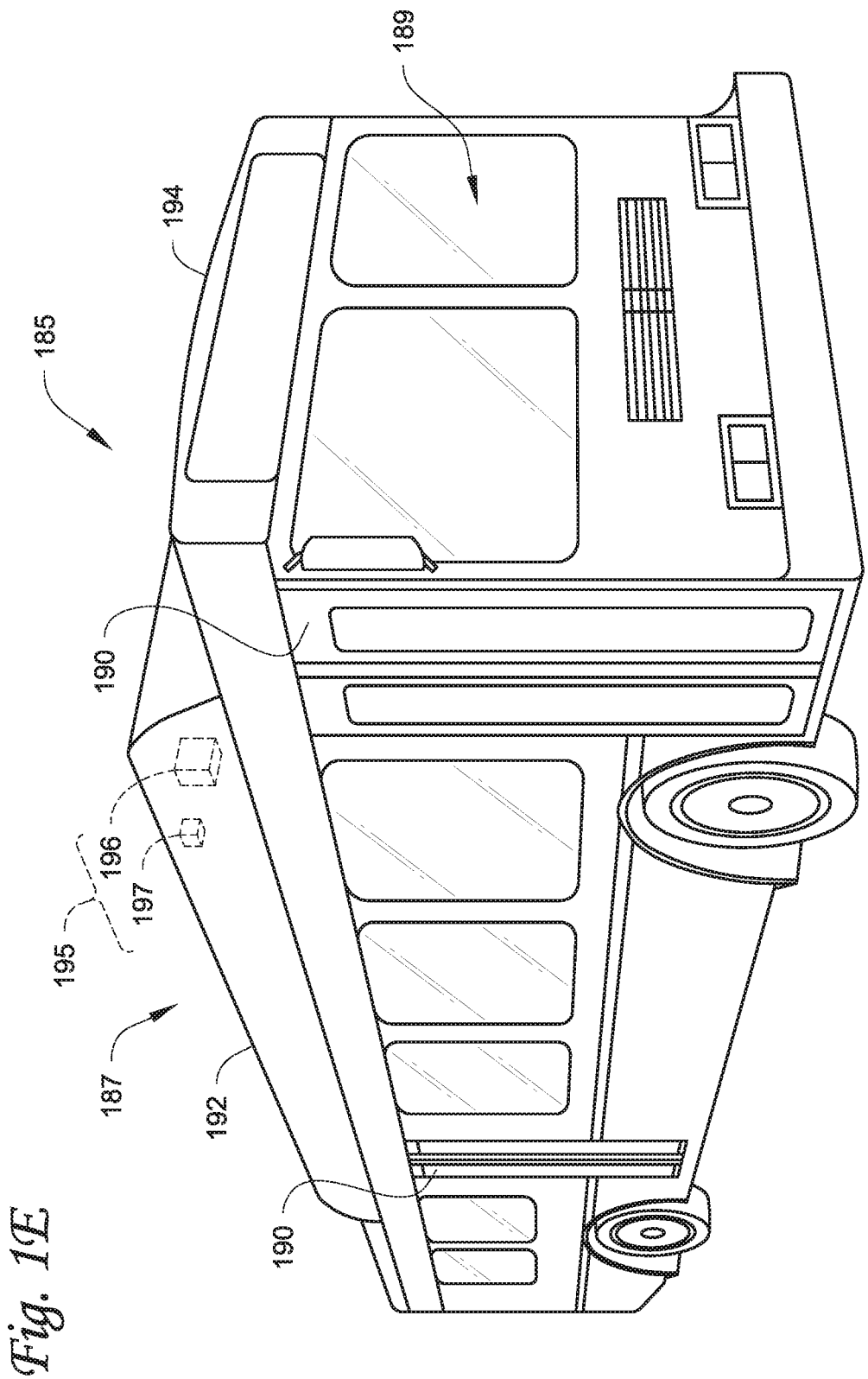
FIG. 1E illustrates a perspective view of a passenger vehicle including a transport climate control system, according to one embodiment.

FIG. 1E is a perspective view of a vehicle 185 including a transport climate control system 187, according to one embodiment. The vehicle 185 is a mass-transit bus that can carry passenger(s) (not shown) to one or more destinations. In other embodiments, the vehicle 185 can be a school bus, railway vehicle, subway car, or other commercial vehicle that carries passengers. The vehicle 185 includes a climate controlled space (e.g., passenger compartment) 189 supported that can accommodate a plurality of passengers. The vehicle 185 includes doors 190 that are positioned on a side of the vehicle 185. In the embodiment shown in FIG. 1E, a first door 190 is located adjacent to a forward end of the vehicle 185, and a second door 190 is positioned towards a rearward end of the vehicle 185. Each door 190 is movable between an open position and a closed position to selectively allow access to the climate controlled space 189. The transport climate control system 187 includes a CCU 192 attached to a roof 194 of the vehicle 185.

The CCU 192 includes a climate control circuit (not shown) that connects, for example, a compressor, a condenser, an evaporator and an expansion device to provide conditioned air within the climate controlled space 189. The transport climate control system 187 also includes a programmable climate controller 195 and one or more sensors (not shown) that are configured to measure one or more parameters of the transport climate control system 187 (e.g., an ambient temperature outside of the vehicle 185, a space temperature within the climate controlled space 189, an ambient humidity outside of the vehicle 185, a space humidity within the climate controlled space 189, etc.) and communicate parameter data to the climate controller 195. The climate controller 195 is configured to control operation of the transport climate control system 187 including components of the climate control circuit. The climate controller 195 may comprise a single integrated control unit 196 or may comprise a distributed network of climate controller elements 196, 197. The number of distributed control elements in a given network can depend upon the particular application of the principles described herein.

It will be appreciated that similar to the climate-controlled van 100, the vehicle 185 including a transport climate control system 187 of FIG. 1E can also include a vehicle PDU (such as the vehicle PDU 101 shown in FIG. 1A), a VES (such as the VES 102 shown in FIG. 1A), a standard charging port (such as the standard charging port 103 shown in FIG. 1A), and/or an enhanced charging port (e.g., the enhanced charging port 104 shown in FIG. 1A), communicating with and distribute power from/to the corresponding ESE and/or the CCU 192.

Figure 2:
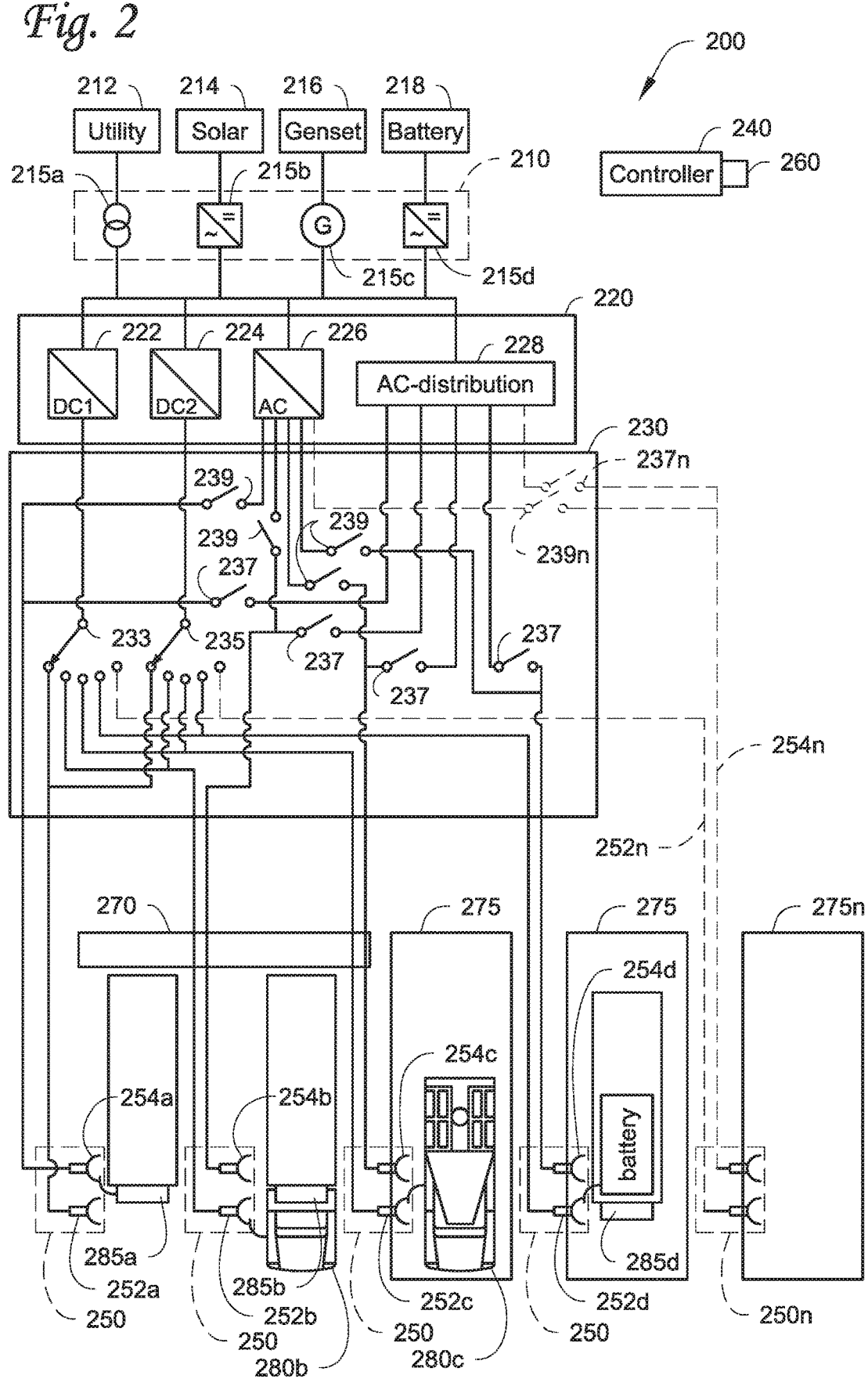
FIG. 2 illustrates a schematic diagram of a power distribution site, according to one embodiment.

FIG. 2 illustrates a schematic diagram of a power distribution site 200, according to one embodiment. The power distribution site 200 is configured to distribute power to one or more electrically powered accessories 285 (e.g., the CCU's 115, 132, 152, 166 and 192 shown in FIGS. 1A-E)

docked at one or more of a plurality of ESE stations 250 of the power distribution site 200. The power distribution site 200 includes a power input stage 210, a power converter stage 220, a transfer switch matrix 230, a power distribution controller 240, the plurality of ESE stations 250, and an optional human machine interface 260. The power distribution site 200 also includes a loading dock 270 and a plurality of parking bays 275 where one or more vehicles 280 and/or electrically powered accessories 285 can be docked. Examples of the power distribution site 200 can be, for example, a shipyard, a warehouse, a supply yard, etc.

The power input stage 210 can be selectively connected to a plurality of power sources 212, 214, 216, 218 that can supply power to the power distribution site 200. In particular, the power input stage 210 includes a transformer connection 215a for feeding power from a utility power source 212 to the power converter stage 220, an inverter connection 215b for feeding power from a solar power source 214 to the power converter stage 220, a generator set connection 215c for feeding power from a generator set 216 to the power converter stage 220, and an inverter connection 215d for feeding power from a battery storage 218 to the power converter stage 220. The power input stage 210 is configured to receive both Alternating Current ("AC") power (e.g., from the utility supply source 212, the solar power source 212, the generator set 214, etc.) and Direct Current ("DC") power (e.g., from the solar power source 212, the generator set 214, the battery storage 218, etc.). The power input stage 210 directs the power received from one or more of the plurality of power sources to the power converter stage 220. The power input stage 210 (including the transformer connection 215a, the inverter connection 215b, the generator set connection 215c, and the inverter connection 215d) are controlled by the power distribution controller 240.

The power converter stage 220 is connected to the power input stage 210 and is configured to convert power received from the power input stage 210 into a power that is compatible with one or more electrically powered accessories 285 docked at the one or more power distribution stages 250. In some embodiments, the power input stage 210 can be connected to the power converter stage 220 via an AC bus and/or a DC bus.

The power converter stage 220 includes a rectifier circuit 222, a DC/DC converter circuit 224, an inverter circuit 226, and an AC distribution circuit 228. The rectifier circuit 222 is configured to convert AC power received from the power input stage 210 (e.g., from the utility power source 212, the solar power source 214, the generator set 216, etc.) into DC power at a voltage and/or current level that is compatible with one or more of the electrically powered accessories 285 docked at the power distribution site 200. The DC/DC converter 224 is configured to convert a voltage and/or current level of DC power received from the power input stage 210 (e.g., from the solar power source 214, the generator set 216, the battery storage 218, etc.) into a DC power that is compatible with one or more of the electrically powered accessories 285 docked at the power distribution site 200. The inverter circuit 226 is configured to convert DC power received from the power input stage 210 (e.g., from the solar power source 214, the generator set 216, the battery storage 218, etc.) into an AC power that is compatible with one or more of the electrically powered accessories 285 docked at the power distribution site 200. The AC distribution circuit 228 is configured to convert a voltage and/or current level of AC power received from the power input stage 210 (e.g., from the utility power source 212, the solar power source 214, the generator set 216, etc.) into an AC power that is compatible with one or more of the electrically powered accessories 285 docked at the power distribution site 200. Power converted by the power converter stage 220 is then directed to the transfer switch matrix 230. It will be appreciated that the number of each of the rectifier circuits 222, DC/DC converter circuits 224, inverter circuits 226, and AC distribution circuits 228 can vary based on the needs of the power distribution site 200.

In some embodiments, the power converter stage 220 can include a modular rack that includes multiple power converter elements (e.g., the rectifier circuits 222, DC/DC converter circuits 224, inverter circuits 226, and AC distribution circuits 228, etc.). Power converter elements can be added/removed from the modular rack as desired. In some embodiments, the modular rack can be stored in a secure cabinet at the power distribution site 200.

In some embodiments, the power input stage 210 and the power converter stage 220 can be controlled by the power distribution controller 240 to store excess power (e.g., from the utility power source 212 and into the battery storage 218) during periods when the cost of utility power is relatively low (e.g., non-peak time periods). Also, in some embodiments, the power input stage 210 can be controlled by the power distribution controller 240 to vary power from each of the power sources 212, 214, 216 and 218 to supply power to one of more of the ESE stations 250. Further, in some embodiments, one or more of the vehicles 280 and/or the electrically powered accessories 285 can requested by the power distribution controller 240 to transfer power back to, for example, the battery storage 218 and/or other vehicles 280 and/or electrically powered accessories 285. Accordingly, the power distribution controller 240 can balance power within the power distribution site 200.

The transfer switch matrix 230 is selectively connected to each of the plurality of ESE stations 250 and is configured to selectively distribute power to one or more of the ESE stations 250. The transfer switch matrix 230 is configured to distribute both AC power and DC power from the power converter stage 220 to one or more of the ESE stations 250. In particular, the transfer switch matrix 230 includes a rectifier switch 233 that can selectively connect the rectifier circuit 222 to one of the ESE stations 250, a DC/DC switch 235 that can selectively connect the DC/DC converter circuit 224 to one of the ESE stations 250c, an inverter switch 226 that can selectively connect the inverter circuit 226 to one of the ESE stations 250, and an AC distribution switch 228 that can selectively connect the AC distribution circuit 228 to one of the ESE stations 250. The transfer switch matrix 230 (including the switches 233, 235, 237, 239) are controlled by the power distribution controller 240. In some embodiments, the transfer switch matrix 230 can include additional switches that may or may not be connected to any of the ESE stations 250. Accordingly, the transfer switch matrix 230 can be configured to connect the power converter stage 220 to less than all of the ESE stations 250. Also, in some embodiments, the number of switches connected to each of the circuits 222, 224, 226, 228 can vary based on the needs of the power distribution site 200.

Each of the ESE stations 250 is configured to distribute power received from the transfer switch matrix 230 to a vehicle and/or an electrically powered accessory docked at the particular station 250. As shown in FIG. 2, the ESE stations 250 are provided at the loading dock 270 and the parking bays 275. It will be appreciated that each of the ESE stations 250 can supply power in the hundreds of kilowatts.

Each of the ESE stations 250 includes a DC charger 252 and an AC charger 254 that are configured to connect to a vehicle and/or an electrically powered accessory. It will be appreciated that in other embodiments, one or more of the ESE stations 250 may include only one of the DC charger 252 and the AC charger 254. In some embodiments, one or more of the DC chargers 252 can be an off-board charger for fast charging. In some embodiments, the ESE stations 250 can communicate with a vehicle and/or an electrically powered accessory.

AC power delivered by the AC charger 254 can be single-phase AC or three phase AC power. DC power delivered by the DC charger 252 can be Low Voltage (LV) DC power (e.g., Class A) and/or High Voltage (HV) DC power (e.g., Class B). As defined herein, "low voltage" refers to Class A of the ISO 6469-3 in the automotive environment, in particular, a maximum working voltage of between about 0V to 60V DC or between about 0V to 30V AC. As defined herein, "high voltage" refers to Class B of the ISO 6469-3 in the automotive environment, in particular, a maximum working voltage of between about 60V to 1500V DC or between about 30V to 1000V AC. The AC charger 254 and the DC charger 252 can include any suitable connectors that support e.g., Combined Charging System (CCS, guided by e.g., CharIN), CHAdeMO, Guobiao recommended-standard 20234, Tesla Supercharger, and/or other EVSE standards. Typically, the AC charger 254 and the DC charger 252 for fast charging from the ESE stations 250 work exclusively. Embodiments disclosed herein can enable supplying both the AC power and the DC power for fast charging/power distribution from the ESE 220 to, for example, supply power to a vehicle and/or charge a rechargeable energy storage of the vehicle or the electrically powered accessory with the DC power and to operate an electrically powered accessory with AC power.

In some embodiments, the DC chargers 252 and the AC chargers 254 can send and receive communication signals between the power distribution controller 240 and one or both of a vehicle controller or electrically powered accessory controller of the vehicle and/or electrically powered accessory docked at one of the ESE stations 250.

In the non-limiting example shown in FIG. 2, the electrically powered accessory 285a and a combination of the vehicle 280b and the electrically powered accessory 285b are parked/docked at the loading dock 270. The electrically powered accessory 285a is a CCU (e.g., the CCU 152 shown in FIG. 1C) attached to a trailer without a tractor. The electrically powered accessory 285a can use AC power supplied by the AC charger 254a to maintain temperature inside the trailer. The vehicle 280b is an electric truck (e.g., the truck 130 shown in FIG. 1B) and the electrically powered accessory 285b is a CCU (e.g., the CCU 133 shown in FIG. 1B). Both the vehicle 280b and the electrically powered accessory 285b can use DC power supplied by the DC charger 252b for charging their respective rechargeable battery storages so that they can operate once dispatched from the power distribution site 200. The vehicle 280c is an electric tractor (e.g., the tractor 142 shown in FIG. 1C) and can use DC power supplied by the DC charger 254c for charging a respective rechargeable battery storage of the vehicle 280c so that the vehicle 280c can operate once dispatched from the power distribution site 200. The electrically powered accessory 285d is a CCU (e.g., the CCU 152 shown in FIG. 1C) attached to a trailer without a tractor. The electrically powered accessory 285d can use DC power supplied by the DC charger 252d to charge a rechargeable energy storage of the electrically powered accessory 285d and use AC power supplied by the AC charger 254d to pre-cool and maintain temperature inside the trailer prior to dispatch from the power distribution site 200.

It will be appreciated that the number and types of vehicles 280 and/or electrically powered accessories 285 parked/docked at the loading dock 270 can vary based on the needs of the power distribution site 200. It will also be appreciated that the number and types of vehicles 280 and/or electrically powered accessories 285 parked/docked at the parking bays 275 can vary based on the needs of the power distribution site 200. It will also be appreciated that the number of loading docks 270 and parking bays 275 can vary based on the needs of the power distribution site 200.

The power distribution controller 240 is configured to control the power input stage 210 and the transfer switching matrix 230. In particular, the power distribution controller 240 is configured to control each of the connections 215 to control which of the power sources 212, 214, 216, 218 are providing power to the power distribution site 200 at any given time. The power distribution controller 240 is also configured to control the switches 233, 235, 237 and 239 to control which of the DC chargers 252 and the AC chargers 254 are supplied power for powering and/or charging a vehicle and/or electrically powered accessory.

The power distribution controller 240 can communicate with one or more external sources including, for example, a telematics unit of a vehicle, a telematics unit of an electrically powered accessory, a traffic service, a weather service, etc. In some embodiments, the optional HMI 260 can allow an operator to communicate with and/or provide instructions to the power distribution controller 240. Also, in some embodiments, the power distribution terminal can send notification data via, for example, a short message service (SMS), email, etc. to one or more users/operators of the vehicles 280 and/or the electrically powered accessories 285.

In some embodiments, the optional HMI 260 can provide a user interface for management of the power distribution site 200 (including the power input stage 210, the power converter stage 220, and/or the transfer switch matrix 230, etc.). In some embodiments, the optional HMI 260 can provide wired and/or wireless connections to one or more remote management platforms (for example over the Internet) to manage the power distribution site 200 (including the power input stage 210, the power converter stage 220, and/or the transfer switch matrix 230, etc.).

The power distribution controller 240 can also be configured to coordinate distribution of power to one or more electrically powered accessories docked at the power distribution site 200. The power distribution controller 240 can coordinate power distribution based on infrastructure data about the power distribution site 200, vehicle/electrically powered accessory data from one or more electrically powered accessories demanding power from one or more ESE stations 250, and external data from an external source that can impact power demand from the one or more electrically powered accessories. The infrastructure data, the electrically powered accessory data, and the external data can be from various inputs and use simulation models and historical data to predict an optimization model for scheduling power distribution to the one or more electrically powered accessories while minimizing overall cost and ensuring that the electrically powered accessories have sufficient power to operate while at the power distribution site 206 and/or sufficient charge to operate when the electrically powered accessory is dispatched from the power distribution site 200. Details of coordinating distribution of power is described in further detail with respect to FIG. 3.

In some embodiments, the power distribution site 200 can be modular such that power distribution capacity can be increased or decreased as required and can be flexible such that the power distribution site 200 includes the plurality of ESE stations 250 that may or may not be capable of distributing power at any given time based on the switches 233, 235, 237, 239. Also, in some embodiments, the power distribution controller 240 can determine whether a new ESE station has been added to or removed from the power distribution site 200. For example, as shown in FIG. 2, the parking bay 275 may not have an associated ESE station 250. Optionally, a new ESE station 250*n* (including an optional DC charger 252*n* and/or an optional AC charger 254*n*) can be connected to a previously unused switch of the transfer switch matrix 230 DC charger 252*n*. Similarly, one of the plurality of ESE stations 250 can be disconnected from the transfer switch matrix 230 when desired. The power distribution controller 240 can communicate with the transfer switch matrix 230 to determine when a ESE station is connected and/or removably disconnected from a switch of the transfer switch matrix 230. Thus, the power distribution controller 240 can dynamically control the transfer switch matrix 230 and coordinate power distribution at the power distribution site 200 amongst the available ESE stations 250 accordingly.

Thus, the power distribution controller 240 can reduce costs by reducing the amount of power distributed at peak power demand rates, can reduce capacity strain on the power distribution site and can enable energy balancing amongst the multiple ESE stations 250.

Figure 3:
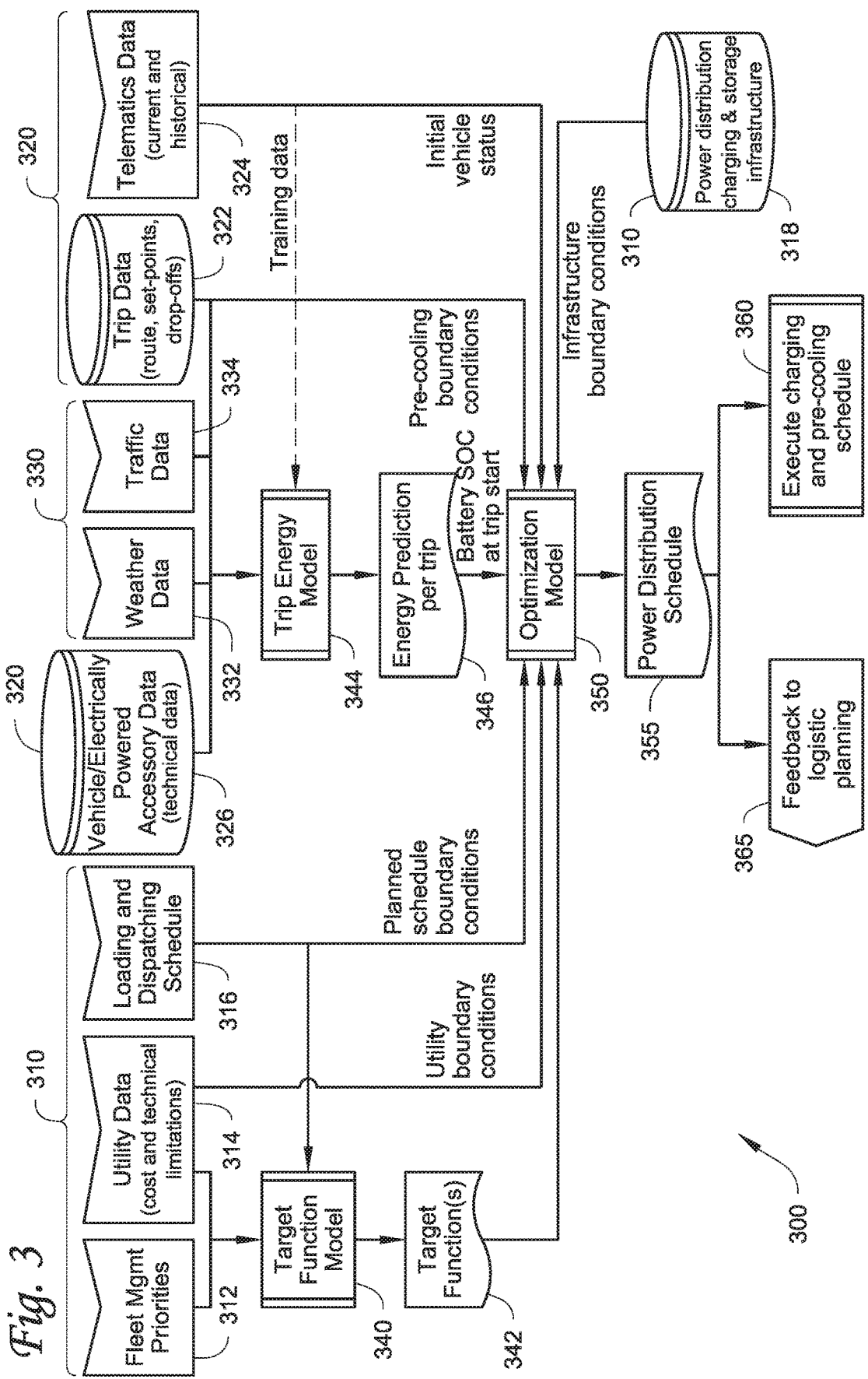
FIG. 3 illustrates a flowchart of a method for optimizing power distribution to one or more electrically powered accessories.

FIG. 3 illustrates a flowchart of a method 300 for optimizing power distribution to one or more vehicles (e.g., the vehicles 280 shown in FIG. 2) and/or one or more electrically powered accessories (e.g., the electrically powered accessories 285 shown in FIG. 2) at a power distribution site (e.g., the power distribution site 200 shown in FIG. 2). For illustrative purposes, the one or more electrically powered accessories described in the method 300 are CCUs. Thus, the term electrically powered accessories and CCUs are used interchangeably. It will be appreciated that in other embodiments, the method 300 can be used with one or more different types of electrically powered accessories. It will also be appreciated that in some embodiments the method 300 can be a rolling or repetitive process that can plan, for example, hours ahead, days ahead, etc. It will also be appreciated that in some embodiments the method 300 can create a model for a plurality of time intervals and can also optionally aggregate all of the time interval models.

The method 300 begins concurrently at 310, 320 and 330. In particular, at 310 a power distribution controller (e.g., the power distribution controller 240 shown in FIG. 2) obtains infrastructure data about the power distribution site. This includes concurrently obtaining fleet management priority data at 312, utility data at 314, loading and dispatching schedule data at 316, and power distribution, charging and storage infrastructure data at 318. The fleet management priority data obtained at 312 can be data provided by one or more of the electrically powered accessories (e.g., via a telematics unit) or via an HMI of the power distribution site (e.g., the optional HMI 260) indicating what factors should be prioritized in using the power distribution site (e.g., dispatch time, minimizing cost of utility power, minimizing energy consumption, prioritizing climate control for certain CCUs, ensuring that one or more of the vehicles can leave on time, prioritizing full charge or partial charge of a particular vehicle, prioritizing order in which each of the vehicles is charged, minimizing cost to a fleet manager (e.g., fully charging a particular vehicle vs. the particular vehicle leaving on time), etc.). The utility data obtained at 314 can include, for example, current and future costs of obtaining utility power from a utility power source (e.g., the utility power source 212 shown in FIG. 2) and/or technical limitations of the power distribution site. The technical limitations can be constraints and/or boundary conditions of the power distribution site and can include, for example, technical limitations of the power source(s) providing power at the power distribution site (e.g., the plurality of power sources 212, 214, 216, 218 shown in FIG. 2), a maximum power amount that can pass through an AC bus from the power source(s) to the vehicle(s), an energy rate, a demand rate, etc. For example, when the power source(s) includes a generator set and/or a battery storage, a technical limitation can be that the generator set and/or the battery storage are only capable of supplying a certain amount of power. In another example, a technical limitation can be that when there is a high demand for power from the power distribution unit, the power distribution unit can attempt to discharge power from a battery storage. The loading and dispatching schedule data obtained at 316 can include information regarding when vehicles and/or electrically powered accessories are arriving to the power distribution site, when vehicles and/or electrically powered accessories are set to leave the power distribution site, etc. When the power distribution controller obtains fleet management priority data at 312, obtains utility data at 314, and obtains loading and dispatching schedule data at 316, the method 300 proceeds to 340. The power distribution controller can use the loading and dispatching schedule data obtained at 316 to provide planned schedule boundary conditions to an optimization model at 350. Planned schedule boundary conditions can include, for example, times at which each of the vehicles are required to be finished charging. Also, the power distribution controller can use the utility data obtained at 314 to provide utility boundary conditions to the optimization model at 350. Utility boundary conditions can include, for example, a capacity of the battery storage, a maximum charging speed, a maximum power being provided by the power distribution site, etc.

The power distribution, charging and storage infrastructure data obtained at 318 can include power distribution capacity of the power distribution site, number and types of power converter elements (e.g., number of rectifier circuits, DC/DC converter circuits, inverter circuits, and/or AC distribution circuits, etc.), a storage capacity of a battery storage (e.g., the battery storage 218 shown in FIG. 2) that can supply power to the vehicle(s) and/or electrically powered accessories, etc. The power distribution, charging and storage infrastructure data obtained at 318 can provide infrastructure boundary conditions that are provided to the optimization model at 350. Infrastructure boundary conditions can include, for example, a maximum capacity of the battery storage at the power distribution site, a minimum capacity of the battery storage at the power distribution site, a maximum capacity of the AC and/or DC chargers of the power distribution site, a minimum capacity of the AC and/or DC chargers of the power distribution site, the number of AC chargers of the power distribution site, the number of DC chargers of the power distribution site, the number of ESE stations, any further information that can be used to plan for charging and/or precooling multiple vehicles and/or electrically powered accessories, etc.

At 320, the power distribution controller obtains vehicle/electrically powered accessory data from one or more vehicles and/or CCUs demanding power from an ESE station (e.g., the ESE stations 250 shown in FIG. 2) at the power distribution site. This includes concurrently obtaining trip data at 322, telematics data 324, and/or vehicle/electrically powered accessory data at 326. The trip data obtained at 322 can include, for example, route information for each of the vehicles and/or CCUs, climate control setpoints for each of the CCUs, drop-off stop(s) for each of the vehicles and/or CCUs, etc. The telematics data (obtained at 324) can be obtained from a telematics unit of the vehicles and/or CCUs. In some embodiments, the telematics data can be current telematics data. In some embodiments, the telematics data can be historical telematics data. Examples of telematics data can include for example, vehicle status data and/or training data. The vehicle status data can include, for example, initial status information regarding the vehicle when it is at the power distribution site and ready to be charged (e.g., current temperature within the climate controlled space, state of charge of the battery of the vehicle/electrically powered accessory, etc.). Training data can include, for example, a mathematical formula that can forecast energy required for a planned trip of the vehicle. The mathematical formula can use, for example, a size of the climate controlled space, an ambient temperature outside of the vehicle, an efficiency of a transport climate controlled unit, an amount of energy required by the transport climate controlled unit to compensate for a loss of cooling to the ambient, traffic data, weather data, and any other current or historic data to determine the amount of power required by the vehicle/electrically powered accessory for a trip. In some embodiments, machine learning based on field data and updates based on data obtained over time can be used to obtain the training data. The vehicle/electrically powered accessory data obtained at 326 can include, for example, technical data regarding the type of power required for operating and/or charging the vehicle/electrically powered accessory including. The technical data can include, for example, a size of the climate controlled space towed by the vehicle, an insulation quality of the climate controlled space, an efficiency of the transport climate controlled unit providing climate control to the climate controlled space, a resistance of rolling of the vehicle, and any other data that can be factor into predicting energy consumption of the vehicle/electrically powered accessory during the trip, The power distribution controller can use the trip data obtained at 322 to provide pre-dispatch boundary conditions of the vehicle and/or electrically powered accessory to the optimization model at 350. The pre-dispatch boundary conditions can include, for example, temperature setpoint data The power distribution controller can use the telematics data obtained at 324 to provide initial status data of the vehicle and/or electrically powered accessory to the optimization model at 350 and can optionally provide training data to a trip energy model at 344. The initial status data of the vehicle and/or electrically powered accessory can include, for example, a state of charge of a battery of the vehicle and/or electrically powered accessory upon arriving at the power distribution center, a current temperature within a climate controlled storage space towed by the vehicle.

At 330, the power distribution controller obtains external data that may be relevant to power distribution optimization. This includes concurrently obtaining weather data at 332 and obtaining traffic data at 334. The weather data can be obtained at 332 by the power distribution controller via, for example, a weather service via the Internet. The traffic data can be obtained at 334 by the power distribution controller via, for example, a traffic service via the Internet. When the power distribution controller obtains the weather data at 332, the traffic data at 334, the vehicle data at 326 and the trip data at 322, the combined data is provided to the trip energy model at 344.

At 340, the power distribution controller uses a target function model to generate one or more target functions at 342. The target functions can include one or more of optimizing against different targets (e.g., minimizing delay for charging the vehicle/electrically powered accessory, minimizing cost for charging the vehicle/electrically powered accessory, minimizing energy consumption of the vehicle/electrically powered accessory, minimizing wear, for example, on a battery of the vehicle/electrically powered accessory, etc. In some embodiments, the target function model can determine a cost for each of the one or more different targets and optimize the model based on the cost for each of the one or more targets. The target functions are provided to the optimization model at 350.

At 344, the power distribution controller uses a trip energy model to generate an energy prediction per trip at 346 for each of the vehicles and/or electrically powered accessories based on the vehicle data, the trip data, the weather data, and the traffic data. In some embodiments, the power distribution controller can input the training data obtained from the telematics data at 324 into the trip energy model at 344 to generate the energy prediction per trip at 346. That is, the trip energy model determines an estimated amount of power required for a vehicle and/or electrically powered accessory during a specified trip. The energy prediction per trip provides a battery state of charge required for the vehicle and/or electrically powered accessory at the start of a trip in order for the vehicle and/or electrically powered accessory have sufficient power to complete the trip. The battery state of charge required for the vehicle and/or electrically powered accessory at the start of a trip is then provided to the optimization model at 350.

At 350, the power distribution controller inputs the target functions obtained at 342, the utility boundary conditions obtained from the utility data at 314, the planned schedule boundary conditions obtained from the loading and dispatching schedule data at 316, the required battery state of charge at the start of a trip obtained from the energy prediction per trip determined at 346, the pre-dispatch boundary conditions obtained from the trip data at 322, the initial status data obtained from the telematics data at 324, and the infrastructure boundary conditions obtained from the power distribution, charging and storage infrastructure data at 318 into the optimization model to generate a power distribution schedule for each of the vehicles and/or electrically powered accessories at 355.

In some embodiments, the power distribution schedule can determine when each of the vehicles and/or electrically powered accessories can charge their respective rechargeable energy storage and/or start operation while parked/docked at the power distribution site. When the electrically powered accessory is a CCU, the power distribution schedule can determine when the CCU can use power from the power distribution site to charge its rechargeable energy storage, when the CCU can begin precooling climate control while at the power distribution site, and when the CCU can use power from the power distribution site to maintain climate control while parked/docked at the power distribution site. The method 300 then proceeds concurrently to 360 and 365.

At 360, the power distribution controller executes the power distribution schedule determined at 355 by controlling one or more of a power input stage (e.g., the power input stage 210 shown in FIG. 2), a power converter stage (e.g., the power converter stage 220 shown in FIG. 2), a transfer switch matrix (e.g., the transfer switch matrix 230 shown in FIG. 2). Accordingly, the power distribution controller can control when and how each of the vehicles and/or electrically powered accessories are provided power from the power distribution site. This allows the power distribution controller to power and/or charge one or more electrically powered accessories and at the same time maintain logistical processes for operating the one or more electrically powered accessories and maintain dispatch schedules for the one or more electrically powered accessories while minimizing costs related to, for example, power demand rates, etc. It will be appreciated that in some embodiments, the power distribution schedule may not schedule for a rechargeable energy storage of a vehicle or electrically powered accessory to be charged to a complete state of charge. Rather, the optimization module can distribute sufficient power to the rechargeable energy storage for an upcoming trip.

At 365, the power distribution controller can provide feedback to a user/operator of at least one of the vehicles and/or electrically powered accessories regarding the power distribution schedule for the particular vehicle and/or electrically powered accessory. In some embodiments, the feedback can include a notification when power is being distributed to the particular vehicle and/or electrically powered accessory, when sufficient power is provided to the vehicle and/or electrically powered accessory to successfully start and complete a trip, and/or when the power distribution controller determines that there may be an alert or failure to provide sufficient power for the vehicle and/or electrically powered accessory to successfully start and complete a trip. In some embodiments, the feedback can also include a notification of a delay, for example, in charging the particular vehicle and/or electrically powered accessory to achieve the desired and/or required state of charge.

Aspects:

It will be appreciated that any of aspects 1-6, aspects 7-13, aspects 14-19, and aspects 20-27 can be combined.

Aspect 1. A method for optimizing power distribution amongst one or more electrical supply equipment stations at a power distribution site for supplying power to one or more transport climate control systems, the method comprising:

obtaining infrastructure data about the power distribution site;

obtaining vehicle/transport climate control system data from the one or more transport climate control systems and one or more vehicles demanding power from the one or more electrical supply equipment, wherein each of the one or more transport climate control systems is configured to provide climate control within a climate controlled space of the vehicle or a transport unit towed by the vehicle;

obtaining external data from an external source that can impact power demand from the one or more transport climate control systems;

generating an optimized power distribution schedule based on the infrastructure data, the vehicle/transport climate control system data and the external data; and distributing power to the one or more transport climate control systems based on the optimized power distribution schedule.

Aspect 2. The method of aspect 1, wherein obtaining the infrastructure data includes obtaining at least one of fleet management priority data, utility data, loading and dispatching schedule data, and power distribution, charging and storage infrastructure data.

Aspect 3. The method of any one of aspects 1 and 2, wherein obtaining vehicle/transport climate control system data includes obtaining at least one of vehicle/transport climate control system data, trip data, and telematics data.

Aspect 4. The method of any one of aspects 1-3, wherein obtaining external data includes obtaining at least one of weather data and traffic data.

Aspect 5. The method of any one of aspects 1-4, wherein generating the optimized power distribution schedule based on the infrastructure data, the vehicle/transport climate control system data and the external data includes inputting at least one of target functions, utility boundary conditions, planned schedule boundary conditions, a battery state of charge at a trip start, pre-dispatch boundary conditions, initial vehicle/electrically powered accessory status, and infrastructure boundary conditions into an optimization model.

Aspect 6. The method of any one of aspects 1-5, further comprising generating a feedback notification to a user regarding the optimized power distribution schedule for the one or more transport climate control systems.

Aspect 7. A power distribution site for distributing power to one or more transport climate control systems, the power distribution site comprising:

a power converter stage configured to convert power received from the one or more of a plurality of power sources into a power that is compatible with at least one of the one or more transport climate control systems;

a plurality of electrical supply equipment stations that distribute power received from the power converter stage to at least one of the one or more transport climate control systems;

a transfer switch matrix selectively connected to each of the plurality of electrical supply equipment stations, wherein the transfer switch matrix selectively distributes power converted by the power converter stage to at least one of the one or more transport climate control systems; and a power distribution controller that controls distribution of power to the one or more transport climate control systems by controlling operation of the power converter stage and the transfer switch matrix.

Aspect 8. The power distribution site of aspect 7, wherein the plurality of power sources includes at least one of a utility power source, a solar power source, a generator set, and a battery storage.

Aspect 9. The power distribution site of any one of aspects 7 and 8, wherein the power converter stage includes at least one of a rectifier circuit that converts AC power from one or more of the plurality of power sources into DC power at a DC voltage and/or current level compatible with at least one of the electrically powered accessories, a DC/DC converter circuit that converts a voltage and/or current level of DC power from one or more of the plurality of power sources into the DC power at the DC voltage and/or current level compatible with at least one of the transport climate control systems, an inverter circuit that converts DC power from one or more of the plurality of power sources into AC power at an AC voltage and/or current level compatible with at least one of the transport climate control systems, and an AC distribution circuit that converts a voltage and/or current level of AC power from one or more of the plurality of power sources into the AC power at the AC voltage and/or current level compatible with at least one of the transport climate control systems.

Aspect 10. The power distribution site of any one of aspects 7-9, wherein each of the plurality of electrical supply equipment stations includes at least one of a DC charger and an AC charger that connects to at least one of the one or more transport climate control systems.

Aspect 11. The power distribution site of any one of aspects 7-10, wherein the power converter stage includes a modular rack that includes one or more rectifier circuits, one or more DC/DC converter circuits, one or more inverter circuits, and one or more AC distribution circuits, wherein each of the one or more rectifier circuits, DC/DC converter circuits, inverter circuits, and AC distribution circuits can be selectively removed from the modular rack.

Aspect 12. The power distribution site of aspect 11, wherein one of an additional rectifier circuit, an additional DC/DC converter circuit, an additional inverter circuit, and an additional AC distribution circuit can be selectively added to the modular rack.

Aspect 13. The power distribution site of any one of aspects 7-12, wherein the power distribution controller is configured to coordinate distribution of power to at least one of the one or more transport climate control systems based on infrastructure data about the power distribution site, vehicle/transport climate control system data from the one or more transport climate control systems demanding power from the power distribution site, and external data from an external source that can impact power demand from at least one of the one or more transport climate control systems.

Aspect 14. A method for optimizing power distribution amongst one or more electrical supply equipment stations at a power distribution site, the method comprising:
  obtaining infrastructure data about the power distribution site;
  obtaining vehicle/electrically powered accessory data from one or more electrically powered accessories and one or more vehicles demanding power from the one or more electrical supply equipment, wherein each of the one or more electrically powered accessories is configured to be used with at least one of a vehicle, a trailer, and a transportation container;
  obtaining external data from an external source that can impact power demand from the one or more electrically powered accessories;
  generating an optimized power distribution schedule based on the infrastructure data, the vehicle/electrically powered accessory data and the external data; and
  distributing power to the one or more electrically powered accessories based on the optimized power distribution schedule.

Aspect 15. The method of aspect 14, wherein obtaining the infrastructure data includes obtaining at least one of fleet management priority data, utility data, loading and dispatching schedule data, and power distribution, charging and storage infrastructure data.

Aspect 16. The method of any one of aspects 14 and 15, wherein obtaining vehicle/electrically powered accessory data includes obtaining at least one of vehicle/electrically powered accessory data, trip data, and telematics data.

Aspect 17. The method of any one of aspects 14-16, wherein obtaining external data includes obtaining at least one of weather data and traffic data.

Aspect 18. The method of any one of aspects 14-17, wherein generating the optimized power distribution schedule based on the infrastructure data, the vehicle/electrically powered accessory data and the external data includes inputting at least one of target functions, utility boundary conditions, planned schedule boundary conditions, a battery state of charge at a trip start, pre-dispatch boundary conditions, initial vehicle/electrically powered accessory status, and infrastructure boundary conditions into an optimization model.

Aspect 19. The method of any one of aspects 14-18, further comprising generating a feedback notification to a user regarding the optimized power distribution schedule for at least one of the one or more electrically powered accessories.

Aspect 20. A power distribution site for distributing power to one or more electrically powered accessories, the power distribution site comprising:
  a power converter stage configured to convert power received from one or more of a plurality of power sources into a power that is compatible with at least one of the one or more electrically powered accessories;
  a plurality of electrical supply equipment stations that distribute power received from the power converter stage to at least one of the one or more electrically powered accessories;
  a transfer switch matrix selectively connected to each of the plurality of electrical supply equipment stations, wherein the transfer switch matrix selectively distributes power converted by the power converter stage to at least one of the one or more electrically powered accessories; and
  a power distribution controller that controls distribution of power to the one or more electrically powered accessories by controlling operation of the power converter stage and the transfer switch matrix.

Aspect 21. The power distribution site of claim 20, wherein the plurality of power sources includes at least one of a utility power source, a solar power source, a generator set, and a battery storage.

Aspect 22. The power distribution site of any one of aspects 20 and 21, wherein the power converter stage includes at least one of a rectifier circuit that converts AC power from one or more of the plurality of power sources into DC power at a DC voltage and/or current level compatible with at least one of the electrically powered accessories, a DC/DC converter circuit that converts a voltage and/or current level of DC power from one or more of the plurality of power sources into the DC power at the DC voltage and/or current level compatible with at least one of the electrically powered accessories, an inverter circuit that converts DC power from one or more of the plurality of power sources into AC power at an AC voltage and/or current level compatible with at least one of the electrically powered accessories, and an AC distribution circuit that converts a voltage and/or current level of AC power from one or more of the plurality of power sources into the AC power at the AC voltage and/or current level compatible with at least one of the electrically powered accessories.

Aspect 23. The power distribution site of any one of aspects 20-22, wherein each of the plurality of electrical supply equipment stations includes at least one of a DC charger and an AC charger that connects to at least one of the one or more electrically powered accessories.

Aspect 24. The power distribution site of any one of aspects 20-23, wherein the electrically powered accessory is a climate control unit of a transport climate control system that is provided on a transport unit.

Aspect 25. The power distribution site of any one of aspects 20-24, wherein the power converter stage includes a modular rack that includes one or more rectifier circuits, one or more DC/DC converter circuits, one or more inverter circuits, and one or more AC distribution circuits, wherein each of the one or more rectifier circuits, DC/DC converter circuits, inverter circuits, and AC distribution circuits can be selectively removed from the modular rack.

Aspect 26. The power distribution site of aspect 25, wherein one of an additional rectifier circuit, an additional DC/DC converter circuit, an additional inverter circuit, and an additional AC distribution circuit can be selectively added to the modular rack.

Aspect 27. The power distribution site of any one of aspects 20-26, wherein the power distribution controller is configured to coordinate distribution of power to at least one of the one or more electrically powered accessories based on infrastructure data about the power distribution site, vehicle/electrically powered accessory data from the one or more electrically powered accessories demanding power from the power distribution site, and external data from an external source that can impact power demand from at least one of the one or more electrically powered accessories.

With regard to the foregoing description, it is to be understood that changes may be made in detail, without departing from the scope of the present invention. It is intended that the specification and depicted embodiments are to be considered exemplary only, with a true scope and spirit of the invention being indicated by the broad meaning of the claims.

What is claimed is:

1. A method for optimizing power distribution amongst one or more electrical supply equipment stations at a power distribution site for supplying power to one or more vehicles and one or more transport climate control systems docked at the one or more electrical supply equipment stations, the method comprising:
    obtaining infrastructure data about the power distribution site;
    obtaining vehicle/transport climate control system data from the one or more transport climate control systems and one or more vehicles demanding power from the one or more electrical supply equipment stations, wherein each of the one or more transport climate control systems is configured to provide climate control within a climate controlled space of the vehicle or a transport unit towed by the vehicle;
    obtaining external data from an external source that can impact power demand from the one or more transport climate control systems;
    generating an optimized power distribution schedule based on the infrastructure data, the vehicle/transport climate control system data and the external data;
    distributing power to the one or more transport climate control systems docked at the one or more electrical supply equipment stations based on the optimized power distribution schedule; and
    generating a feedback notification to a user of a particular transport climate control system of the one or more transport climate control systems docked at the one or more electrical supply equipment stations regarding the optimized power distribution schedule, wherein the feedback notification includes a notification when power is being distributed to the particular transport climate control system.

2. The method of claim 1, wherein obtaining the infrastructure data includes obtaining at least one of fleet management priority data, utility data, loading and dispatching schedule data, and power distribution, charging and storage infrastructure data.

3. The method of claim 1, wherein obtaining vehicle/transport climate control system data includes obtaining at least one of vehicle/transport climate control system data, trip data, and telematics data.

4. The method of claim 1, wherein obtaining external data includes obtaining at least one of weather data and traffic data.

5. The method of claim 1, wherein generating the optimized power distribution schedule based on the infrastructure data, the vehicle/transport climate control system data and the external data includes inputting at least one of target functions, utility boundary conditions, planned schedule boundary conditions, a battery state of charge at a trip start, pre-dispatch boundary conditions, initial vehicle/electrically powered accessory status, and infrastructure boundary conditions into an optimization model.

6. The method of claim 1, wherein the power distribution schedule determines when each of the one or more transport climate control systems begin precooling while at the power distribution site and when each of the one or more transport climate control systems is allowed to use power from the power distribution site to maintain climate control within a respective climate controlled space while at the power distribution site.

7. The method of claim 1, wherein the feedback notification includes a notification when there is a failure to provide sufficient power for the particular transport climate control system to successfully start and complete a trip.

8. The method of claim 1, wherein the transport climate control system is configured to control an environmental condition within a climate controlled space to maintain cargo.

9. A power distribution site for distributing power to one or more transport climate control systems, the power distribution site comprising:
    a power converter stage configured to convert power received from one or more of a plurality of power sources into a power that is compatible with at least one of the one or more transport climate control systems;
    a plurality of electrical supply equipment stations that distribute power received from the power converter stage to at least one of the one or more transport climate control systems;
    a transfer switch matrix selectively connected to each of the plurality of electrical supply equipment stations, wherein the transfer switch matrix selectively distributes power converted by the power converter stage to at least one of the one or more transport climate control systems; and
    a power distribution controller that controls distribution of power to the one or more transport climate control systems by controlling operation of the power converter stage and the transfer switch matrix, wherein the power distribution controller is configured to generate a feedback notification to a user of a particular transport climate control system of the one or more transport climate control systems docked at the one or more electrical supply equipment stations regarding an optimized power distribution schedule, wherein the feedback notification includes a notification when power is being distributed to the particular transport climate control system,
    wherein the power converter stage includes at least one of a rectifier circuit that converts AC power from one or more of the plurality of power sources into DC power at a DC voltage and/or current level compatible with at least one of the transport climate control systems, a DC/DC converter circuit that converts a voltage and/or current level of DC power from one or more of the plurality of power sources into the DC power at the DC voltage and/or current level compatible with at least one of the transport climate control systems, an inverter circuit that converts DC power from one or more of the plurality of power sources into AC power at an AC voltage and/or current level compatible with at least one of the transport climate control systems, and an AC distribution circuit that converts a voltage and/or current level of AC power from one or more of the plurality of power sources into the AC power at the AC voltage and/or current level compatible with at least one of the transport climate control systems.

10. The power distribution site of claim 9, wherein the plurality of power sources includes at least one of a utility power source, a solar power source, a generator set, and a battery storage.

11. The power distribution site of claim 9, wherein each of the plurality of electrical supply equipment stations includes at least one of a DC charger and an AC charger that connects to at least one of the one or more transport climate control systems.

12. The power distribution site of claim 9, wherein the power distribution controller is configured to coordinate distribution of power to at least one of the one or more transport climate control systems based on infrastructure data about the power distribution site, vehicle/transport climate control system data from the one or more transport climate control systems demanding power from the power distribution site, and external data from an external source that can impact power demand from at least one of the one or more transport climate control systems.

13. The power distribution site of claim 9, wherein the optimized power distribution schedule is based on at least one of infrastructure data about the power distribution site, vehicle/transport climate control system data from the one or more transport climate control systems and one or more vehicles demanding power from the one or more electrical supply equipment stations, and external data from an external source that can impact power demand from the one or more transport climate control systems.

14. A power distribution site for distributing power to one or more transport climate control systems, the power distribution site comprising:
a power converter stage configured to convert power received from one or more of a plurality of power sources into a power that is compatible with at least one of the one or more transport climate control systems;
a plurality of electrical supply equipment stations that distribute power received from the power converter stage to at least one of the one or more transport climate control systems;
a transfer switch matrix selectively connected to each of the plurality of electrical supply equipment stations, wherein the transfer switch matrix selectively distributes power converted by the power converter stage to at least one of the one or more transport climate control systems; and
a power distribution controller that controls distribution of power to the one or more transport climate control systems by controlling operation of the power converter stage and the transfer switch matrix,
wherein the power converter stage includes a modular rack that includes one or more rectifier circuits, one or more DC/DC converter circuits, one or more inverter circuits, and one or more AC distribution circuits, wherein each of the one or more rectifier circuits, DC/DC converter circuits, inverter circuits, and AC distribution circuits can be selectively removed from the modular rack.

15. The power distribution site of claim 14, wherein one of an additional rectifier circuit, an additional DC/DC converter circuit, an additional inverter circuit, and an additional AC distribution circuit can be selectively added to the modular rack.

* * * * *